US011438616B2

(12) United States Patent
Zhao et al.

(10) Patent No.: US 11,438,616 B2
(45) Date of Patent: Sep. 6, 2022

(54) METHOD AND APPARATUS FOR VIDEO CODING

(71) Applicant: TENCENT AMERICA LLC, Palo Alto, CA (US)

(72) Inventors: Liang Zhao, Sunnyvale, CA (US); Xin Zhao, Santa Clara, CA (US); Xiang Li, Saratoga, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/000,156

(22) Filed: Aug. 21, 2020

(65) Prior Publication Data

US 2021/0067792 A1    Mar. 4, 2021

Related U.S. Application Data

(60) Provisional application No. 62/892,356, filed on Aug. 27, 2019.

(51) Int. Cl.
| | |
|---|---|
| *H04N 19/44* | (2014.01) |
| *H04N 19/119* | (2014.01) |
| *H04N 19/13* | (2014.01) |
| *H04N 19/159* | (2014.01) |
| *H04N 19/176* | (2014.01) |
| *H04N 19/46* | (2014.01) |
| *H04N 19/169* | (2014.01) |

(52) U.S. Cl.
CPC .......... *H04N 19/44* (2014.11); *H04N 19/119* (2014.11); *H04N 19/13* (2014.11); *H04N 19/159* (2014.11); *H04N 19/176* (2014.11); *H04N 19/1883* (2014.11); *H04N 19/46* (2014.11)

(58) Field of Classification Search
None
See application file for complete search history.

(56) References Cited

U.S. PATENT DOCUMENTS

| | | | | |
|---|---|---|---|---|
| 2018/0192076 | A1* | 7/2018 | Ikai ..................... | H04N 19/176 |
| 2020/0252608 | A1* | 8/2020 | Ramasubramonian ..................... H04N 19/176 |
| 2020/0344469 | A1* | 10/2020 | Coban .................. | H04N 19/176 |
| 2020/0413050 | A1* | 12/2020 | Wang .................... | H04N 19/11 |

FOREIGN PATENT DOCUMENTS

WO    WO 2019/154936 A1    8/2019

OTHER PUBLICATIONS

De-Luxán-Hernández, Santiago et al. "CE3: Intra Sub-Partitions Coding Mode (Tests 1.1.1 and 1.1.2)" Joint Video Experts Team (JVET) of ITU-T SG 16 WP 3 and ISO/IEC JTC 1/SC 29/WG 11; 13th Meeting: Marrakech, MA, Jan. 9-18, 2019.

(Continued)

*Primary Examiner* — Talha M Nawaz
(74) *Attorney, Agent, or Firm* — Arentfox Schiff LLP

(57) ABSTRACT

A method of video decoding at a video decoder can include partitioning a coding tree block (CTB) into coding blocks, determining whether an intra sub-partition (ISP) mode is allowable for a current block based on a first block size of the current block that is one of the coding blocks, and decoding the current block according to the ISP mode when the ISP mode is allowed for the current block.

14 Claims, 14 Drawing Sheets

(56) References Cited

OTHER PUBLICATIONS

De-Luxán-Hernández, Santiago et a. "Non-CE3: Proposed ISP cleanup" Joint Video Experts Team (JVET) of ITU-T SG 16 WP 3 and ISO/IEC JTC 1/SC 29/WG 11; 15th Meeting: Gothenburg, SE, Jul. 3-12, 2019.
Brass, Benjamin et al. "Versatile Video Coding (Draft 6)" Joint Video Experts Team (JVET) of ITU-T SG 16 WP 3 and ISO/IEC JTC 1/SC 29/WG 11; 15th Meeting: Gothenburg, SE, Jul. 3-12, 2019.
Internationai Search Report and Written Opinion dated Nov. 20, 2020 in International Application No. PCT/US20/47814.

\* cited by examiner

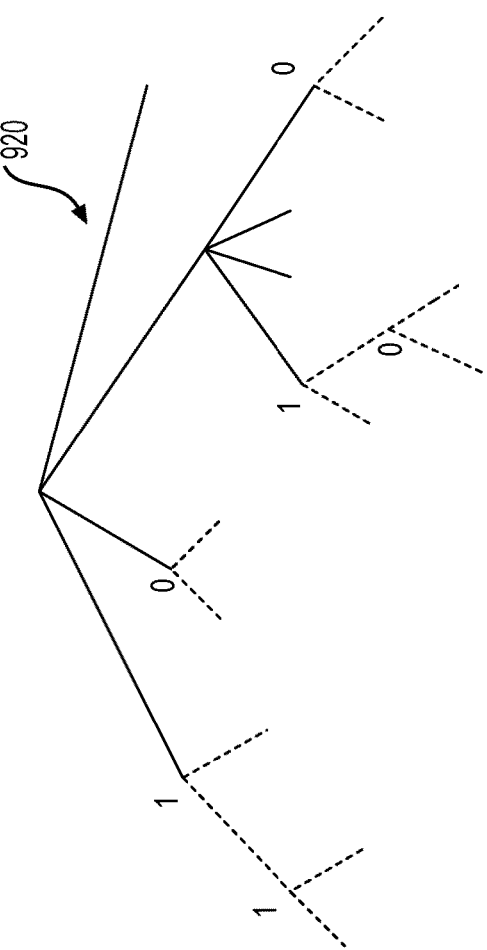
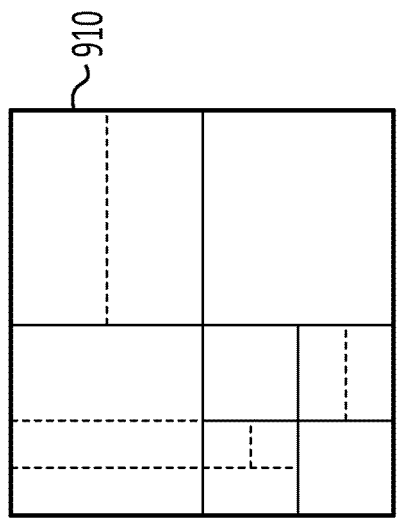
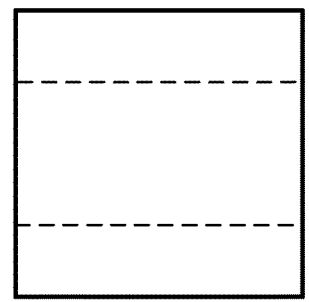
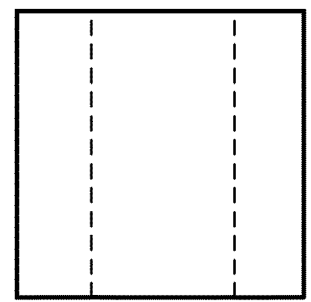
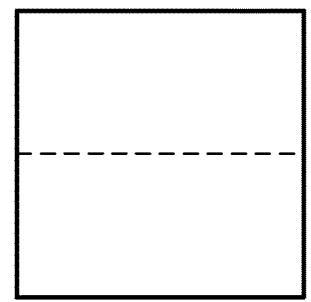
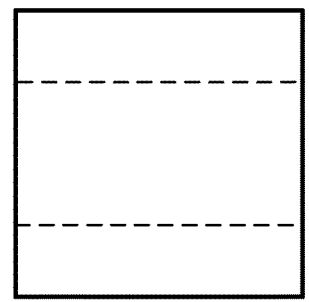

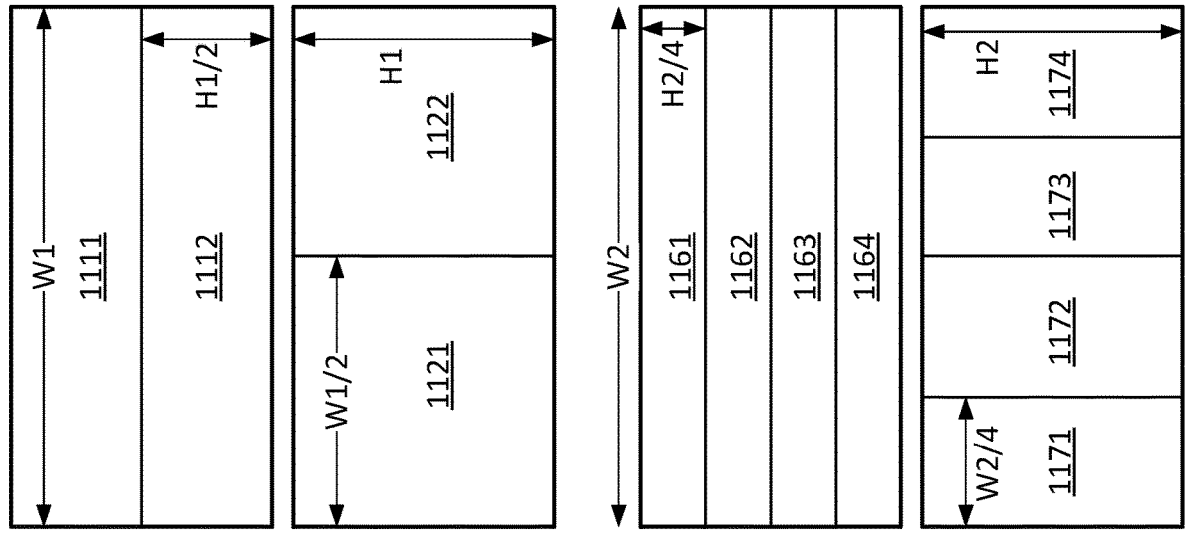
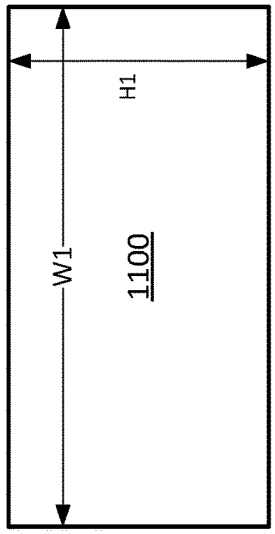
FIG. 11A
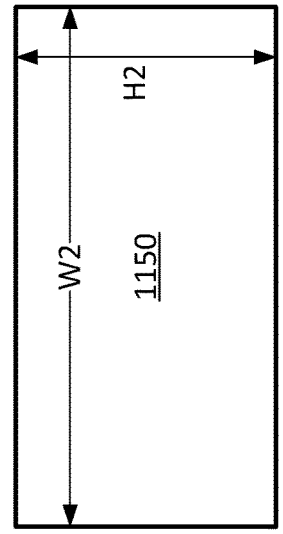
FIG. 11B

METHOD AND APPARATUS FOR VIDEO CODING

INCORPORATION BY REFERENCE

This present disclosure claims the benefit of priority to U.S. Provisional Application No. 62/892,356, "Improvement for Intra Sub-Partition" filed on Aug. 27, 2019, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920× 1080 luminance samples and associated chrominance samples. The series of pictures can have a fixed or variable picture rate (informally also known as frame rate), of, for example 60 pictures per second or 60 Hz. Uncompressed video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth and/or storage space requirements, in some cases by two orders of magnitude or more. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

Referring to FIG. 1, depicted in the lower right is a subset of nine predictor directions known from H.265's 33 possible predictor directions (corresponding to the 33 angular modes of the 35 intra modes). The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 2 shows a schematic (201) that depicts 65 intra prediction directions according to JEM to illustrate the increasing number of prediction directions over time.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

SUMMARY

Aspects of the disclosure provide a method of video decoding at a video decoder. The method can include partitioning a coding tree block (CTB) into coding blocks, determining whether an intra sub-partition (ISP) mode is allowable for a current block based on a first block size of the current block that is one of the coding blocks, and decoding the current block according to the ISP mode when the ISP mode is allowed for the current block.

In an embodiment, the first block size is represented by one of a block width of the current block, a block height of the current block, or a sum of the block width and the block height of the current block. In an embodiment, the ISP mode is disallowed for the current block when a minimum of the block width and the block height of the current block is equal to or greater than a threshold. In an embodiment, the ISP mode is disallowed for the current block when a maximum of the block width and the block height of the current block is equal to or greater than a threshold. In an embodiment, the ISP mode is disallowed for the current block when a block area of the current block is equal to or greater than a threshold.

In an embodiment, the ISP mode is disallowed for the current block when an aspect ratio of the current block is equal to or smaller than a threshold. The aspect ratio is a maximum of a first ratio of a block width to a block height of the current block and a second ratio of the block height to the block width of the current block. The threshold can be an integer greater than 1.

In some embodiments, a context model for entropy decoding an ISP mode flag can be determined according to a second block size of the current block that is one of the coding blocks. The ISP mode flag indicates whether the ISP mode is applied to the current block. The second block size is represented by one of a block width of the current block, a block height of the current block, or a sum of the block width and the block height of the current block.

In an embodiment, the context model for entropy decoding the ISP mode flag is determined according to whether a minimum of the block width and the block height of the current block is equal to or greater than a threshold. In an embodiment, the context model for entropy decoding the ISP mode flag is determined according to whether a maximum of the block width and the block height of the current block is equal to or greater than a threshold.

In an embodiment, the context model for entropy decoding the ISP mode flag is determined according to whether a block area of the current block is equal to or greater than a threshold. In an embodiment, the context model for entropy decoding the ISP mode flag is determined according to whether an aspect ratio of the current block is equal to or greater than a threshold. The aspect ratio can be a maximum of a first ratio of a block width to a block height of the current block and a second ratio of the block height to the block width of the current block.

In some embodiments, the ISP mode is applicable to non-square blocks, and not applicable to square blocks. In an embodiment, either of a horizontal split type or a vertical split type is allowed for each of the non-square blocks. In an embodiment, a split type indicating a vertical split or a horizontal split can be determined based on a block width and a block height of the current block.

In an embodiment, when the ISP mode is allowed for the current block, a vertical split type is determined or the current block when a ratio of a block height of the current block to a block width of the current block is greater than or equal to a first threshold, and a horizontal split type is determined for the current block when a ratio of the block width of the current block to the block height of the current block is greater than or equal to a second threshold.

In an embodiment, a horizontal split of the ISP mode is not allowed for a coding block of the non-square blocks having a width of 8 samples and a height of 64 samples, and a vertical split of the ISP mode is not allowed for a coding block of the non-square blocks having a width of 64 samples and a height of 8 samples.

Aspects of the disclosure provide an apparatus of video decoding. The apparatus can include circuitry configured to partition a coding tree block (CTB) into coding blocks, determine whether an intra sub-partition (ISP) mode is allowable for a current block based on a block size of the current block that is one of the coding blocks, and decode the current block according to the ISP mode when the ISP mode is allowed for the current block.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which:

FIG. 9A shows a coding tree unit (CTU) (910) that is partitioned by using a quad-tree plus binary tree (QTBT) partitioning structure (920).

FIG. 9B shows the QTBT partitioning structure (920).

FIG. 10A shows a horizontal binary tree.

FIG. 10B shows a vertical binary tree.

FIG. 10C shows a horizontal center-side ternary-tree.

FIG. 10D shows a vertical center-side ternary-tree.

FIG. 11A shows a horizontal partition and a vertical partition of a coding block (1100) that is coded in ISP mode according to an embodiment of the disclosure.

FIG. 11B show a horizontal partition and a vertical partition of another coding block (1150) that is coded in ISP mode according to an embodiment of the disclosure.

DETAILED DESCRIPTION OF EMBODIMENTS

I. Video Encoder and Decoder System

Figure 1:
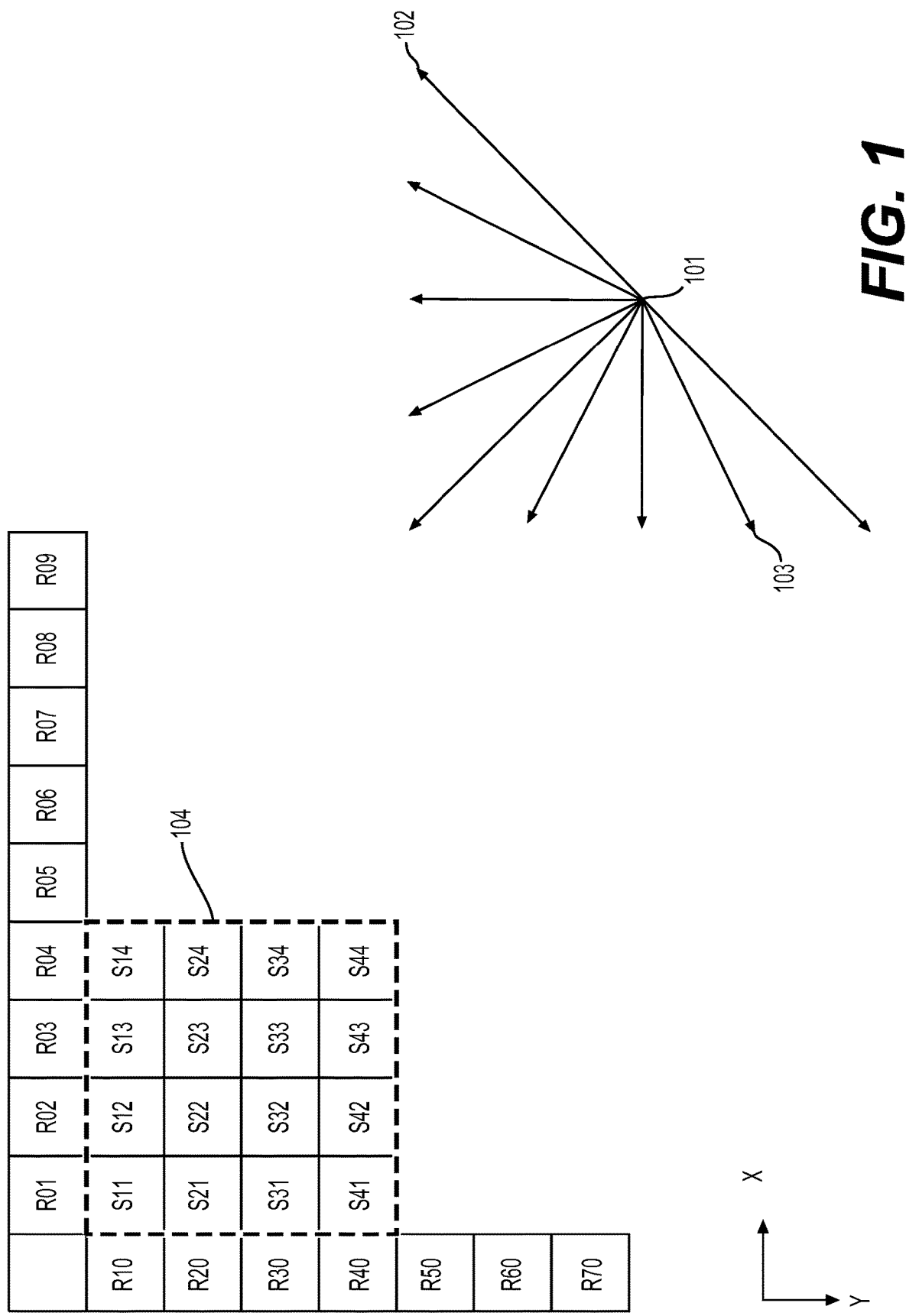
FIG. 1 is a schematic illustration of an exemplary subset of intra prediction modes.
Figure 2:
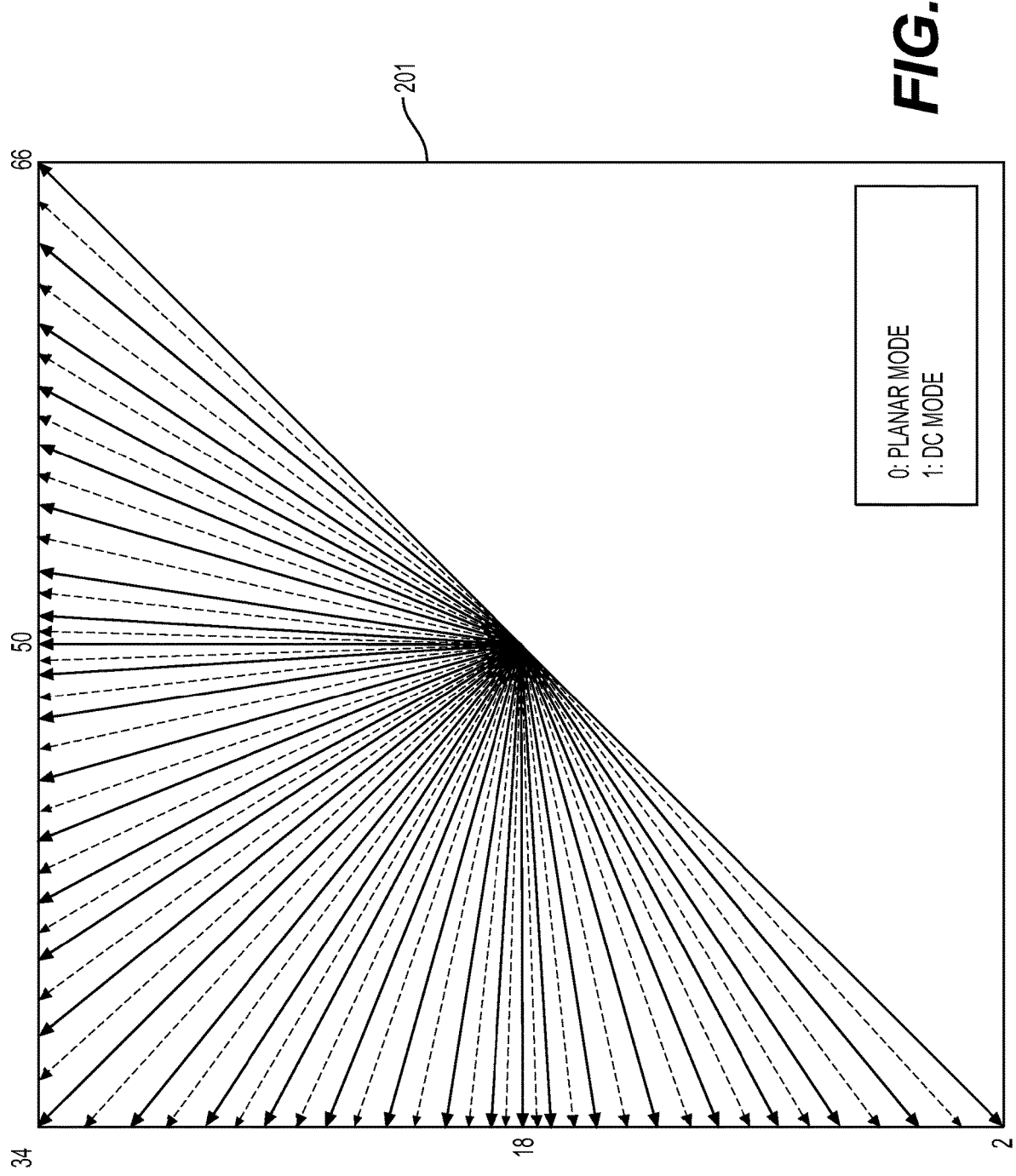
FIG. 2 is an illustration of exemplary intra prediction directions.
Figure 3:
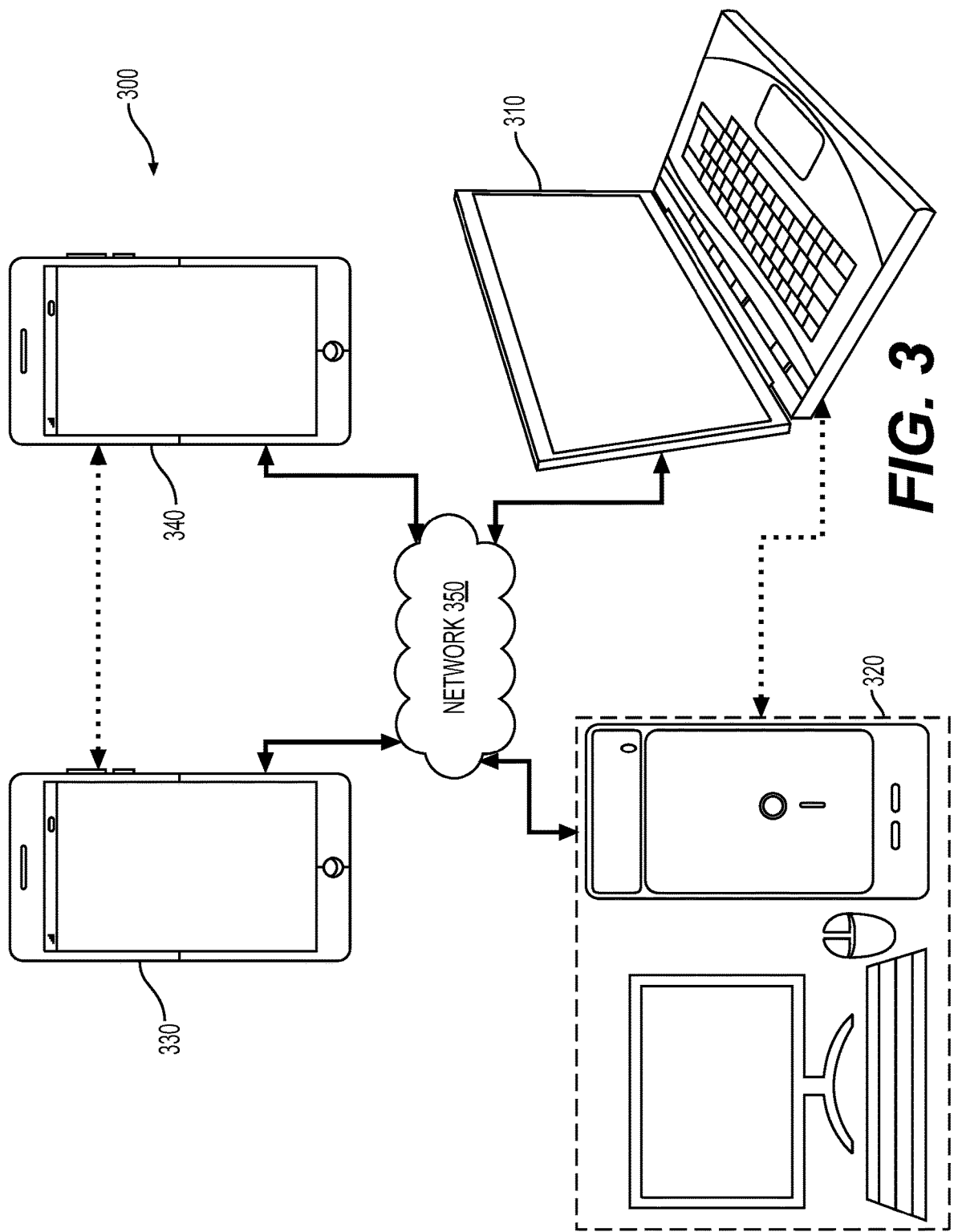
FIG. 3 is a schematic illustration of a simplified block diagram of a communication system (300) in accordance with an embodiment.

FIG. 3 illustrates a simplified block diagram of a communication system (300) according to an embodiment of the present disclosure. The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that performs bidirectional transmission of coded video data that may occur, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the FIG. 3 example, the terminal devices (310), (320), (330) and (340) may be illustrated as servers, personal computers and smart phones but the principles of the present disclosure may be not so limited. Embodiments of the present disclosure find application with laptop computers, tablet computers, media players and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
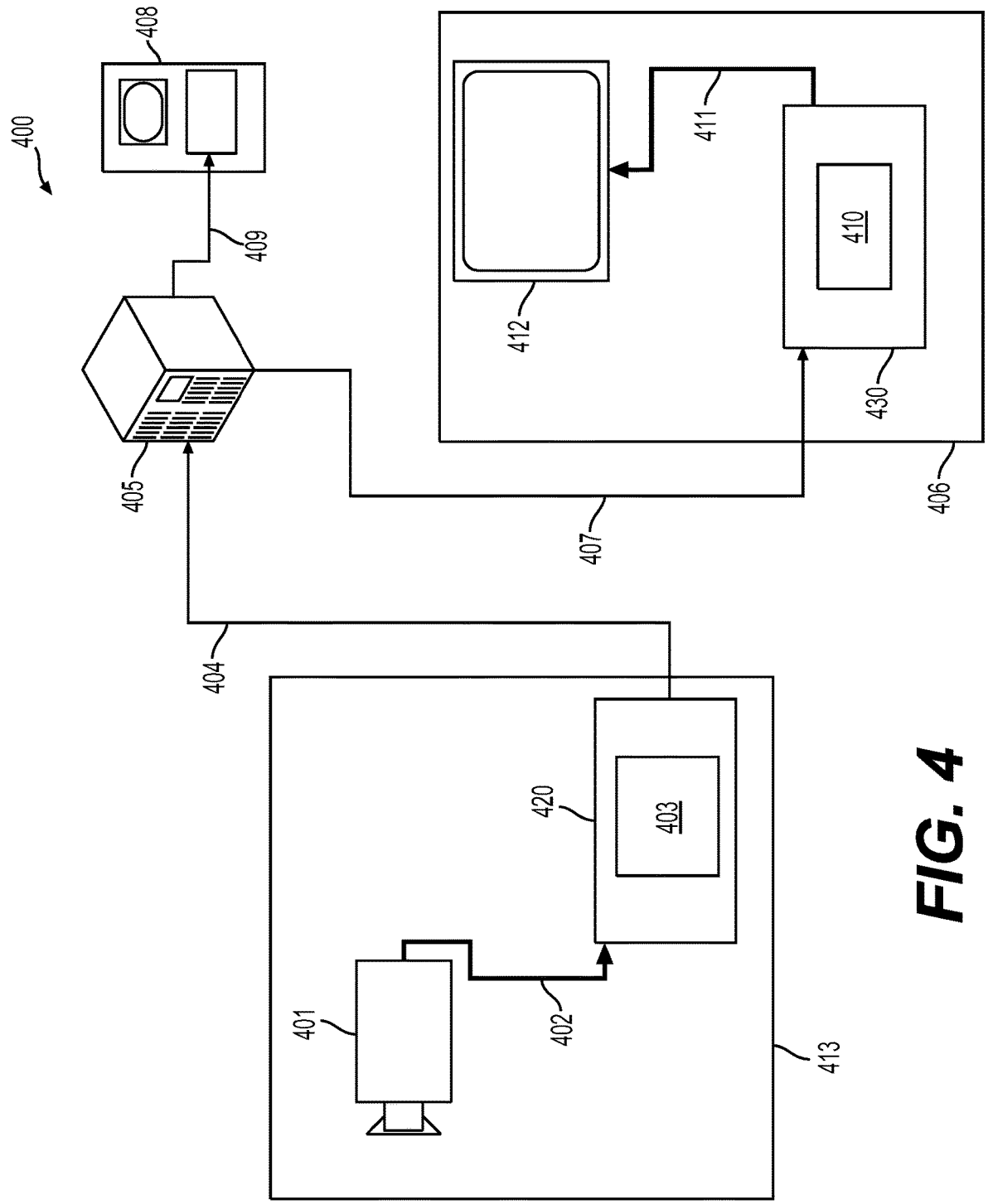
FIG. 4 is a schematic illustration of a simplified block diagram of a communication system (400) in accordance with an embodiment.

FIG. 4 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream (404)), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
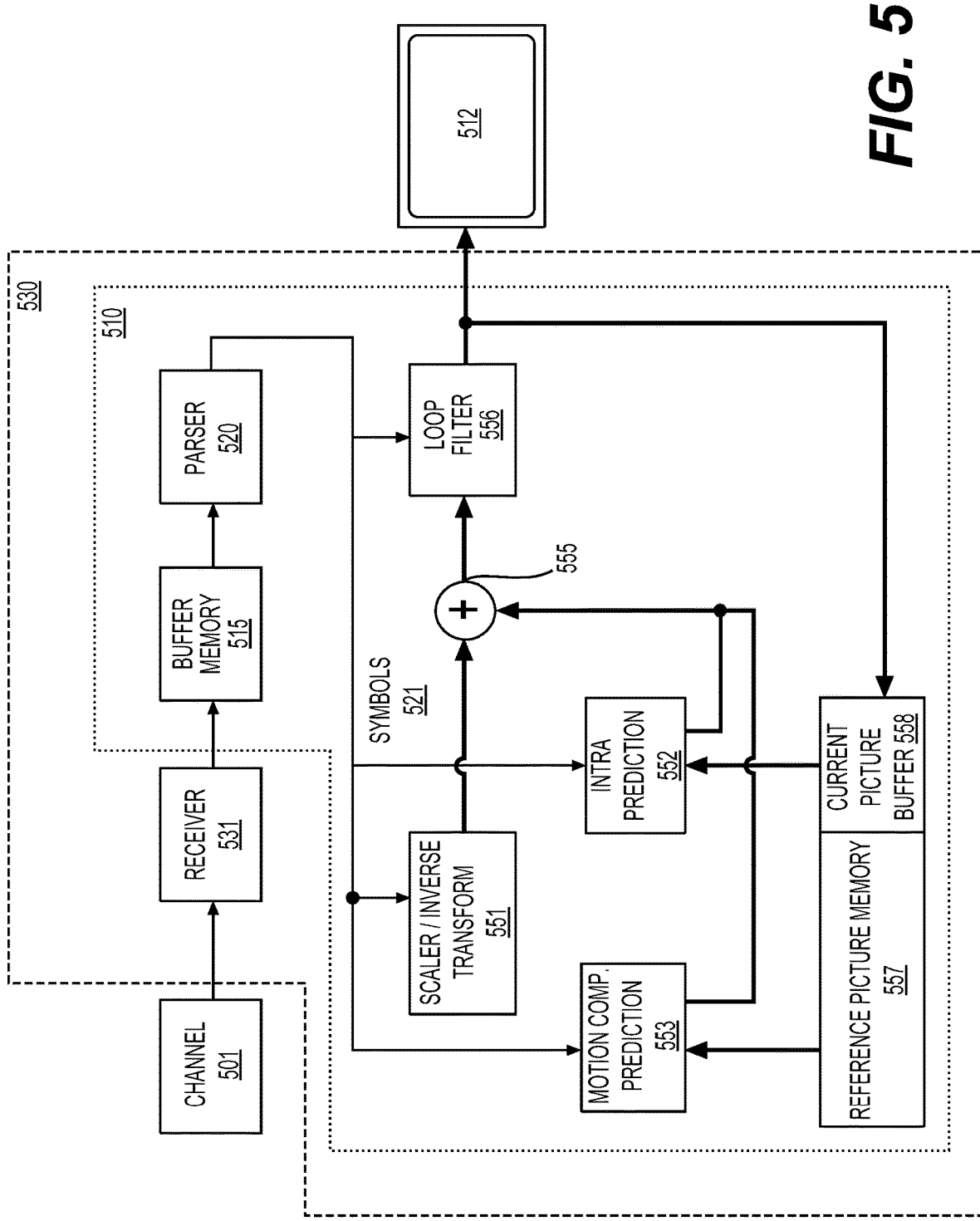
FIG. 5 is a schematic illustration of a simplified block diagram of a decoder in accordance with an embodiment.

FIG. 5 shows a block diagram of a video decoder (510) according to an embodiment of the present disclosure. The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510); in the same or another embodiment, one coded video sequence at a time, where the decoding of each coded video sequence is independent from other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as was shown in FIG. 5. The control information for the rendering device(s) may be in the form of Supplemental Enhancement Information (SEI messages) or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
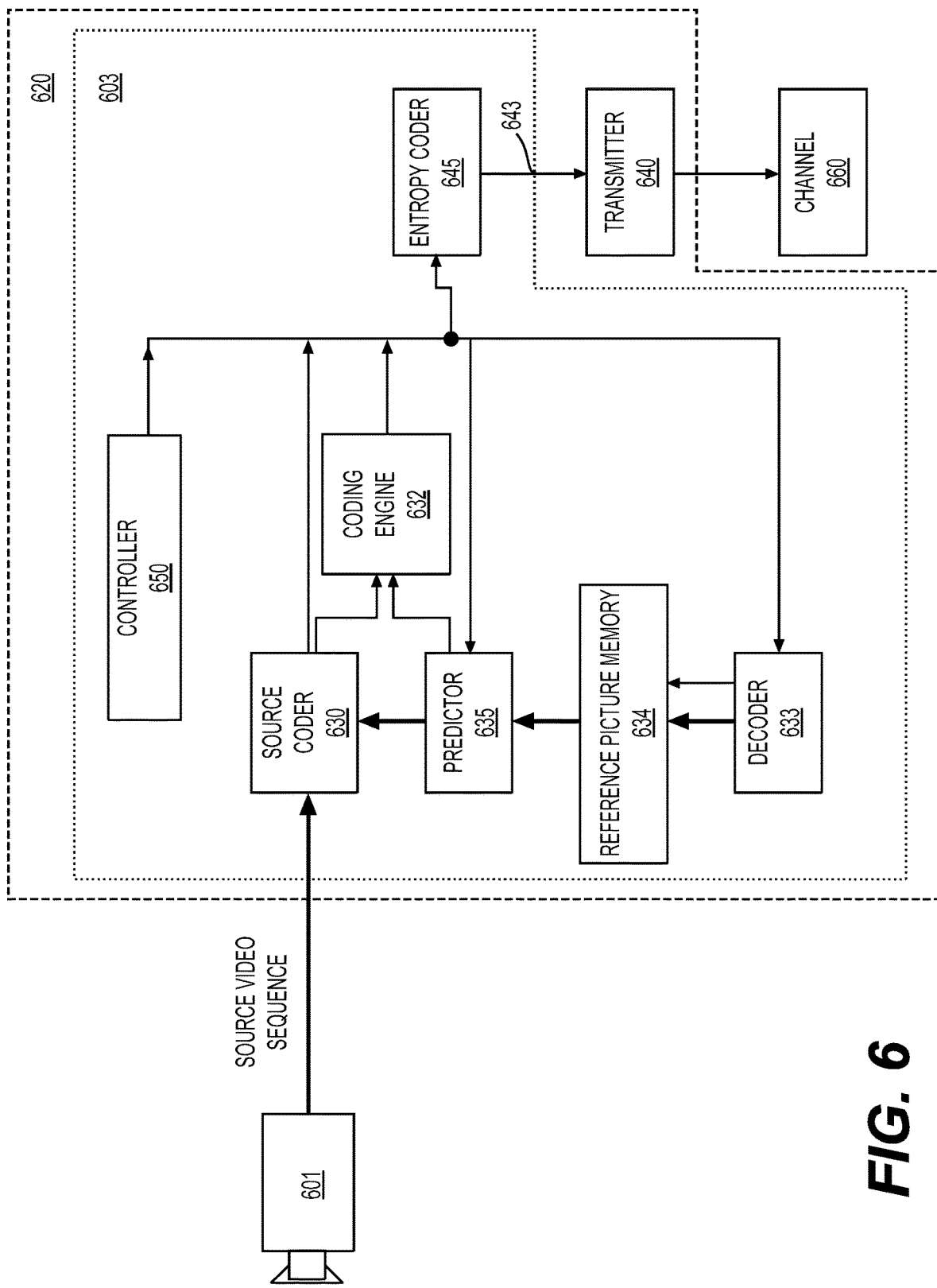
FIG. 6 is a schematic illustration of a simplified block diagram of an encoder in accordance with an embodiment.

FIG. 6 shows a block diagram of a video encoder (603) according to an embodiment of the present disclosure. The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compressing the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video coder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
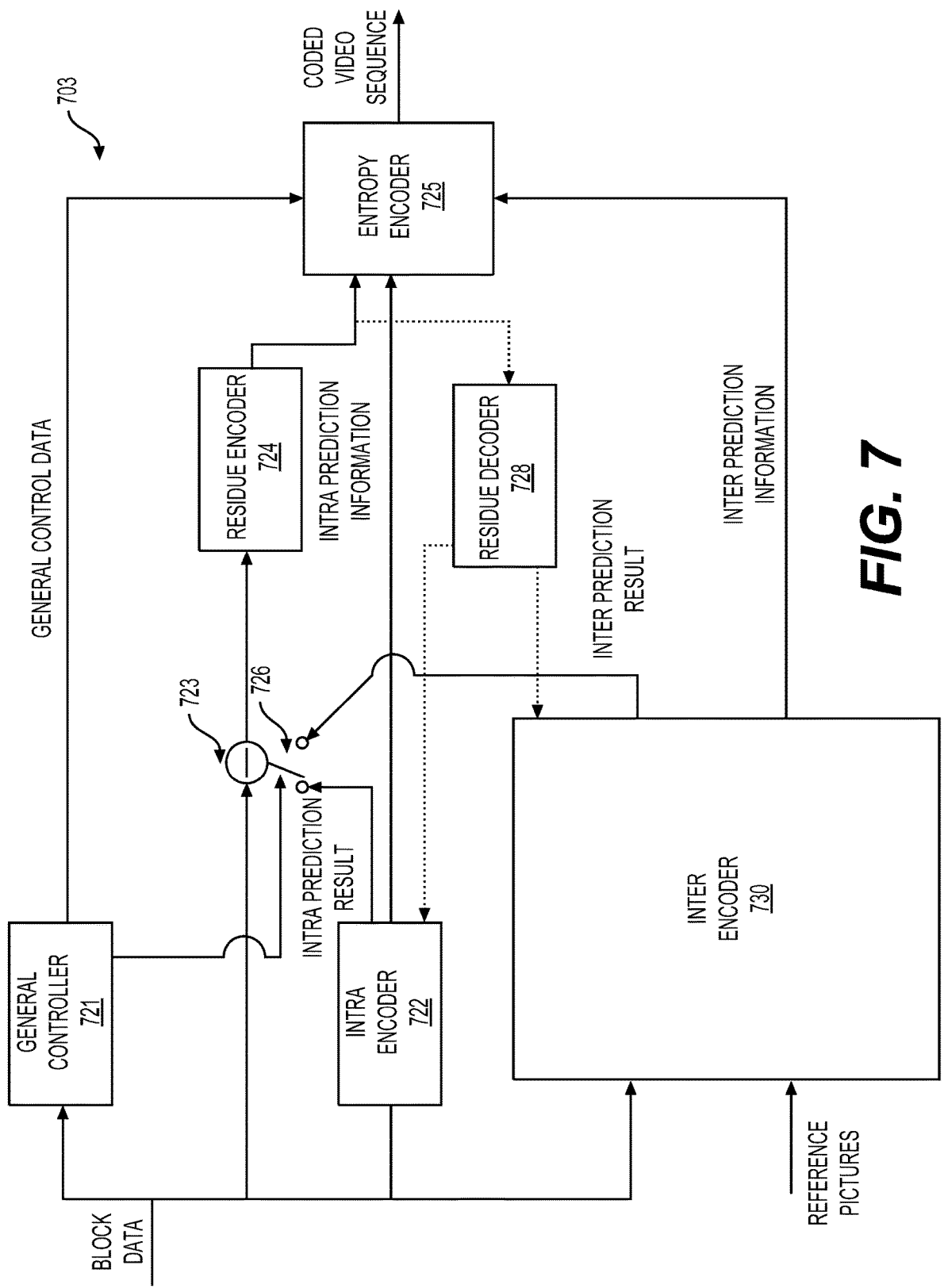
FIG. 7 shows a block diagram of an encoder in accordance with another embodiment.

FIG. 7 shows a diagram of a video encoder (703) according to another embodiment of the disclosure. The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes the inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
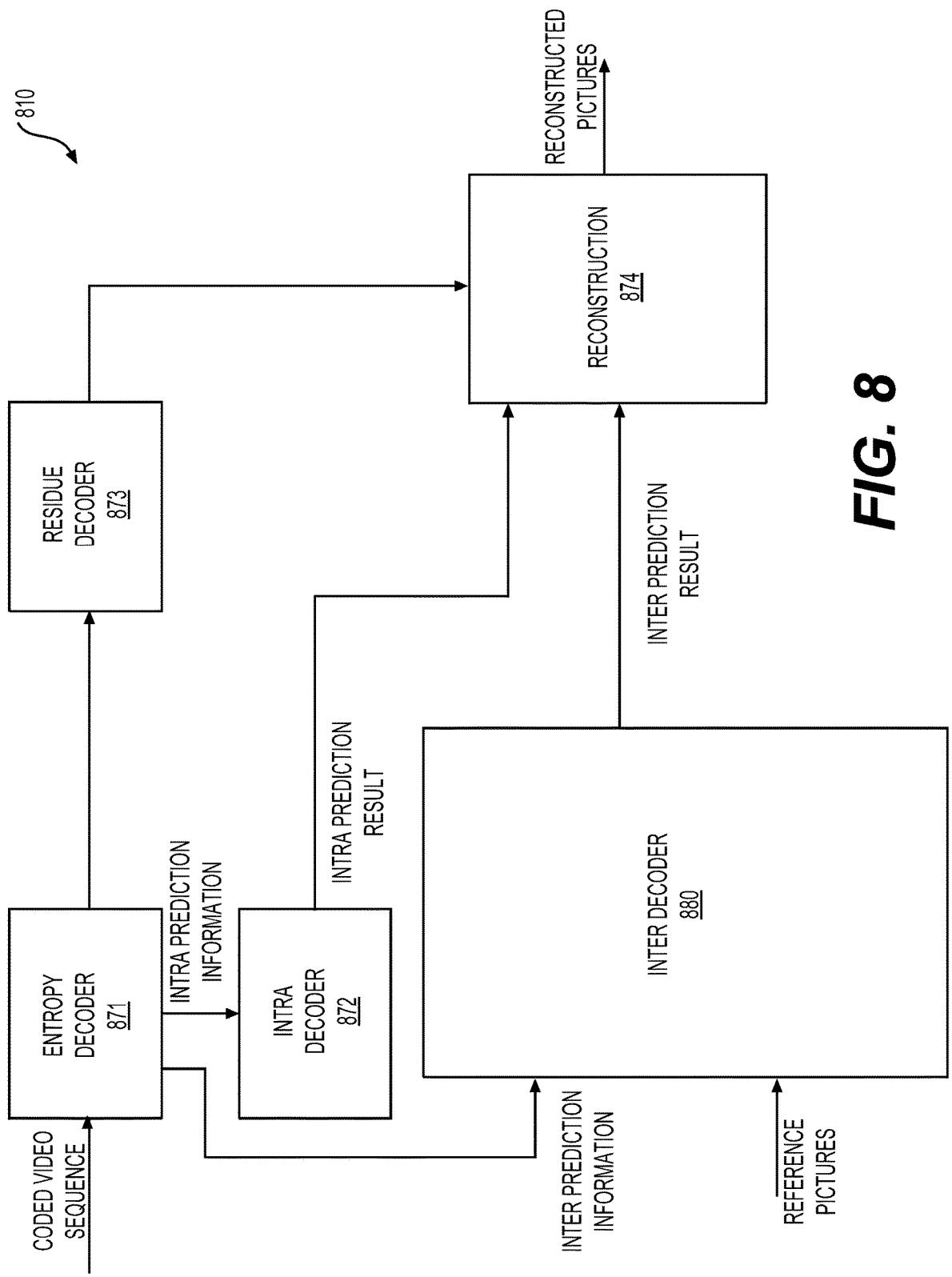
FIG. 8 shows a block diagram of a decoder in accordance with another embodiment.

FIG. 8 shows a diagram of a video decoder (810) according to another embodiment of the disclosure. The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (872) or the inter decoder (880), respectively, residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

II. Intra Sub-Partition Coding Mode

1. Quadtree Block Partitioning Structure

A block partitioning structure can be employed to produce a coding tree that includes a root node, non-leaf nodes, and leaf nodes. In some embodiments, by using a quadtree structure, a coding tree unit (CTU) can be split into coding units (CUs) (leaf node CUs or leaf CUs in a coding tree) to adapt to various local characteristics. For example, the CTU can be partitioned into intermediate CUs (non-leaf node CUs or non-leaf CUs) with a quadtree split. An intermediate CU can be further partitioned in a recursive way using the quadtree structure with a restriction of an allowable CU size.

In this disclosure, during a process where a CTU is partitioned into CUs based as indicated by a coding tree, a CU refers to a leaf node CU in a coding tree, while an intermediate CU (between the CTU and the CUs in the coding tree) refers to a non-leaf node CU in the coding tree.

A decision on whether to code a picture area using an inter-picture (temporal) or intra-picture (spatial) prediction is made at the leaf CU level. For a leaf CU to-be-coded with inter prediction, the leaf CU can be further split, for example, into one, two, or four prediction units (PUs) according to a PU splitting type. Inside one PU, a same prediction process is applied and relevant information is transmitted to a decoder on a PU basis. Similarly, for a leaf CU to-be-coded with intra prediction, the leaf CU can be further partitioned for applying different intra coding modes.

After obtaining a residual block of a leaf CU by applying a prediction process, the leaf CU can be partitioned into transform units (TUs) according to another quadtree structure. As can be seen, there are multiple partition conceptions including CU (leaf node CU), PU, and TU. In some embodiments, a CU or a TU can only be square shape, while a PU may be square or rectangular shape. In some embodiments, one coding block corresponding to a leaf CU may be further split into four square sub-blocks, and transform is performed on each sub-block, i.e., TU. One coding block corresponding to a leaf CU can be split recursively into smaller TUs using a quadtree structure which is called residual quadtree (RQT).

At a picture boundary, in some embodiments, implicit quadtree split can be employed so that a block will keep quad-tree splitting until the size fits the picture boundary.

2. Quadtree Plus Binary Tree (QTBT) Block Partitioning Structure

In some embodiments, a quadtree plus binary tree (QTBT) structure is employed. The QTBT structure removes the concepts of multiple partition types (the CU, PU and TU concepts), and supports more flexibility for leaf CU partition shapes. In the QTBT block structure, a (leaf) CU can have either a square or rectangular shape.

FIG. 9A shows a CTU (910) that is partitioned by using a QTBT structure (920) shown in FIG. 9B. The CTU (910) is first partitioned by a quadtree structure. The resulting quadtree nodes are further partitioned by a binary tree structure or a quadtree structure. The quadtree splitting is represented as solid lines, while the binary tree splitting is represented by dashed lines. There can be two splitting types, symmetric horizontal splitting and symmetric vertical splitting, in the binary tree splitting. The binary tree leaf nodes CUs can be used for prediction and transform processing without any further partitioning (e.g., no PUs in the leaf CUs). Accordingly, CU, PU and TU can have the same block size in the QTBT coding block structure in the example of FIG. 9A and FIG. 9B.

In some embodiments, a CU can include coding blocks (CBs) of different color components. For example, one CU contains one luma CB and two chroma CBs in the case of P and B slices of the 4:2:0 chroma format. A CU can include a CB of a single color component. For example, one CU contains only one luma CB or just two chroma CBs in the case of I slices.

The following parameters are defined for the QTBT partitioning scheme in some embodiments:
  CTU size: the root node size of a quadtree.
  MinQTSize: the minimum allowed quadtree leaf node size.
  MaxBTSize: the maximum allowed binary tree root node size.
  MaxBTDepth: the maximum allowed binary tree depth.
  MinBTSize: the minimum allowed binary tree leaf node size.

In one example of the QTBT partitioning structure, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (i.e., the MinQTSize) to 128×128 (i.e., the CTU size). If the leaf quadtree node is 128×128, it will not be further split by the binary tree since the size exceeds the MaxBTSize (i.e., 64×64). Otherwise, the leaf quadtree node could be further partitioned by the binary tree. Therefore, the quadtree leaf node is also the root node for the binary tree and it has the binary tree depth as 0.

When the binary tree depth reaches MaxBTDepth (i.e., 4), no further splitting is considered. When the binary tree node has a width equal to MinBTSize (i.e., 4), no further horizontal splitting is considered. Similarly, when the binary tree node has a height equal to MinBTSize, no further vertical splitting is considered. The leaf nodes of the binary tree are further processed by prediction and transform processing without any further partitioning (e.g., no PU partition). In an embodiment, a maximum CTU size is 256×256 luma samples.

In each splitting (i.e., non-leaf) node of the binary tree, one flag can be signaled to indicate which splitting type (i.e., horizontal or vertical) is used. For example, 0 indicates a horizontal splitting and 1 indicates a vertical splitting. For the quadtree splitting, there is no need to indicate the splitting type since quadtree splitting can split a block both horizontally and vertically to produce 4 sub-blocks with an equal size.

In some embodiments, the QTBT scheme supports the flexibility for the luma and chroma to have a separate QTBT structure. For example, for P and B slices, the luma and chroma blocks in one CTU share the same QTBT structure. However, for I slices, the luma CTB is partitioned into CUs by a QTBT structure, and the chroma blocks are partitioned into chroma CUs by another QTBT structure. Thus, a CU in an I slice consists of a coding block of the luma component or coding blocks of two chroma components, and a CU in a P or B slice consists of coding blocks of all three color components.

In some embodiments, inter prediction for small blocks is restricted to reduce memory access of motion compensation. For example, bi-prediction is not supported for 4×8 and 8×4 blocks, and inter prediction is not supported for 4×4 blocks.

3. Ternary Tree (TT) Block Partitioning Structure

In some embodiments, a multi-type-tree (MTT) structure is used for partitioning a picture. The MTT structure is a more flexible tree structure than the QTBT structure. In MTT, in addition to quad-tree and binary-tree (horizontal or vertical), horizontal center-side ternary-tree and vertical center-side ternary-tree as shown in FIG. 10C and FIG. 10D, respectively, are employed. Ternary tree partitioning can complement quad-tree and binary-tree partitioning. For example, ternary-tree partitioning is able to capture objects which locate in a block center, while quad-tree and binary-tree splits crossing block centers. In an example, the width and height of partitions by ternary trees are a power of 2 so that no additional transform partition is needed.

For example, when the MTT structure is employed, a CTU can first be split into four CUs by a quadtree structure. Then, each CU can be further partitioned recursively by a quadtree structure, a binary tree structure, or a ternary tree structure. The partitioning may be restricted with CU sizes and split types of a parent CU. There are two splitting types, symmetric horizontal splitting (FIG. 10A or FIG. 10C) and symmetric vertical splitting (FIG. 10B and FIG. 10D), in the binary tree and ternary tree splitting. Accordingly, a parent CU can be split into two, three or four sub-CUs (or child CUs). Each CU can have a square or rectangular shape.

4. Intra Sub-Partition (ISP) Coding Mode

A luma coding block that is coded in intra sub-partition (ISP) coding mode can be vertically (in a vertical ISP mode) or horizontally (in a horizontal ISP mode) partitioned into a plurality of sub-partitions (e.g., 2 or 4) depending on a block size of the block, as shown in Table 1. Table 1 illustrates examples of sub-partitions depending on block size.

TABLE 1

| Block Size | Number of Sub-partitions |
|---|---|
| 4 × 4 | Not divided |
| 4 × 8 and 8 × 4 | 2 |
| All other cases | 4 |

In some examples, all sub-partitions fulfill a condition of having at least 16 samples. For chroma components, the ISP mode may not be applied. In some examples, at most two bins are signaled for ISP. A first bin indicates whether ISP is used. If ISP is used, a second bin is further signaled to indicate a direction of ISP unless only one direction is available.

FIGS. 11A and 11B show examples of sub-partitions. FIG. 11A shows a horizontal partition and a vertical partition of a coding block (1100) that is coded in ISP mode according to an embodiment of the disclosure. In the FIG. 11A example, a block size of the coding block (1100) is W1×H1, which for example is either 4×8 or 8×4 samples. Accordingly, the coding block (1100) is partitioned into 2 sub-partitions. As shown in FIG. 11A, the coding block (1100) can be horizontally partitioned into two sub-partitions (1111)-(1112) with each having a size of W1×H1/2 samples, or vertically partitioned into two sub-partitions (1121)-(1122) with each having a size of W1/2×H1 samples.

FIG. 11B show a horizontal partition and a vertical partition of another coding block (1150) that is coded in ISP mode according to an embodiment of the disclosure. In the FIG. 11B example, the coding block (1150) having a size of W2×H2, and is larger than blocks having a size of 4×8 or 8×4 samples. Accordingly, the coding block (1150) is partitioned into 4 sub-partitions. As shown in FIG. 11B, the coding block (1150) can be horizontally partitioned into four sub-partitions (1161)-(1164) with each having a size of W2×H2/4 samples, or vertically partitioned into four sub-partitions (1171)-(1174) with each having a size of W2/4× H2 samples.

In some examples, for each of these sub-partitions, a residual signal can be generated through entropy decoding of coefficient levels sent by an encoder and then through inverse quantizing and inverse transforming of the coefficient levels. Then, for one of the sub-partitions, which can be referred to as a current sub-partition, a prediction signal can be generated by performing intra prediction on the current sub-partition. Reconstructed samples of the current sub-partition can be obtained by adding the residual signal to the prediction signal. Thereafter, the reconstructed samples of the current sub-partition can be used to predict another sub-partition, for example that is next to the current sub-partition. This process can be repeated to other sub-partitions. All sub-partitions can share the same intra mode.

In some examples, the ISP mode can only be tested with intra modes that are part of a most probable mode (MPM) list. Accordingly, if a CU is coded in ISP mode, then an MPM flag of the MPM list can be inferred to be, for example, one or true. In some cases, the MPM list can be modified to exclude DC mode and to prioritize horizontal intra prediction modes for the horizontal ISP mode (ISP mode with a horizontal partition) and vertical intra prediction modes for the vertical ISP mode (ISP mode with a vertical partition).

In some examples, each sub-partition can be regarded as a sub-TU, since transform and reconstruction can be performed individually for each sub-partition.

As an example, specification texts related with ISP mode in VVC Draft 6 (JVET-O2001-vE) are described below.

Tables 2-3 together show syntax of a coding unit in tabular form. The syntax related with ISP mode can be seen at rows 33-36.

TABLE 2

```
1   coding_unit( x0, y0, cbWidth, cbHeight, cqtDepth, treeType, modeType ) {
2       chType = treeType = = DUAL_TREE_CHROMA? 1 : 0
3       if( slice_type != I | | sps_ibc_enabled_flag | | sps_palette_enabled_flag) {
4           if( treeType != DUAL_TREE_CHROMA &&
                !( ( ( cbWidth = = 4 && cbHeight = = 4 ) | | modeType = = MODE_TYPE_INTRA )
                   && !sps_ibc_enabled_flag ) )
5               cu_skip_flag[ x0 ][ y0 ]                                              ae(v)
6           if( cu_skip_flag[ x0 ][ y0 ] = = 0 && slice_type != I
                && !( cbWidth = = 4 && cbHeight = = 4 ) && modeType = = MODE_TYPE_ALL )
7               pred_mode_flag                                                        ae(v)
8           if( ( ( slice_type = = I && cu_skip_flag[ x0 ][ y0 ] = =0 ) | |
                  ( slice_type != I && ( CuPredMode[ chType ][ x0 ][ y0 ] != MODE_INTRA | |
                    ( cbWidth = = 4 && cbHeight = = 4 && cu_skip_flag[ x0 ][ y0 ] = = 0 ) ) ) ) &&
                cbWidth <= 64 && cbHeight <= 64 && modeType != MODE_TYPE_INTER &&
                sps_ibc_enabled_flag && treeType != DUAL_TREE_CHROMA )
9               pred_mode_ibc_flag                                                    ae(v)
10          if( ( ( ( slice_type = = I | | ( cbWidth = = 4 && cbHeight = = 4 ) | | sps_ibc_enabled_flag )
                &&
                  CuPredMode[ x0 ][ y0 ] = = MODE_INTRA ) | |
                  ( slice_type != I && !( cbWidth = = 4 && cbHeight = = 4 ) &&
                    !sps_ibc_enabled_flag
                    && CuPredMode[ x0 ][ y0 ] != MODE_INTRA ) ) &&
                sps_palette_enabled_flag
                &&
                  cbWidth <=64 && cbHeight <=64 && && cu_skip_flag[ x0 ][ y0 ] = = 0
                &&
                  modeType != MODE_INTER )
```

TABLE 2-continued

| | | |
|---|---|---|
| 11 | pred_mode_plt_flag | ae(v) |
| 12 | } | |
| 13 | if( CuPredMode[ chType ][ x0 ][ y0 ] = = MODE_INTRA \| \|<br>    CuPredMode[ chType ][ x0 ][ y0 ] = = MODE_PLT ) { | |
| 14 |   if( treeType = = SINGLE_TREE \| \| treeType = = DUAL_TREE_LUMA ) { | |
| 15 |     if( pred_mode_plt_flag ) { | |
| 16 |       if( treeType = = DUAL_TREE_LUMA ) | |
| 17 |         palette_coding( x0, y0, cbWidth, cbHeight, 0, 1 ) | |
| 18 |       else /* SINGLE_TREE */ | |
| 19 |         palette_coding( x0, y0, cbWidth, cbHeight, 0, 3 ) | |
| 20 |     } else { | |

TABLE 3

| | | |
|---|---|---|
| 21 |     if( sps_bdpcm_enabled_flag &&<br>    cbWidth <= MaxTsSize && cbHeight <= MaxTsSize ) | |
| 22 |       intra_bdpcm_flag | ae(v) |
| 23 |     if( intra_bdpcm_flag ) | |
| 24 |       intra_bdpcm_dir_flag | ae(v) |
| 25 |     else { | |
| 26 |       if( sps_mip_enabled_flag &&<br>      ( Abs( Log2( cbWidth ) − Log2( cbHeight ) ) <= 2 ) &&<br>      cbWidth <= MaxTbSizeY && cbHeight <= MaxTbSizeY ) | |
| 27 |         intra_mip_flag[ x0 ][ y0 ] | ae(v) |
| 28 |       if( intra_mip_flag[ x0 ][ y0 ] ) | |
| 29 |         intra_mip_mode[ x0 ][ y0 ] | ae(v) |
| 30 |       else { | |
| 31 |         if( sps_mrl_enabled_flag && ( ( y0 % CtbSizeY ) > 0 ) ) | |
| 32 |           intra_luma_ref_idx[ x0 ][ y0 ] | ae(v) |
| 33 * |         if ( sps_isp_enabled_flag && intra_luma_ref_idx[ x0 ] [ y0 ] = = 0<br>        &&<br>        ( cbWidth <= MaxTbSizeY && cbHeight <= MaxTbSizeY ) &&<br>        ( cbWidth * cbHeight > MinTbSizeY * MinTbSizeY ) ) | |
| 34 * |           intra_subpartitions_mode_flag[ x0 ][ y0 ] | ae(v) |
| 35 * |         if( intra_subpartitions_mode_flag[ x0 ][ y0 ] = = 1 ) | |
| 36 * |           intra_subpartitions_split_flag[ x0 ][ y0 ] | ae(v) |
| 37 |         if( intra_luma_ref_idx[ x0 ] [ y0 ] = = 0 ) | |
| 38 |           intra_luma_mpm_flag[ x0 ][ y0 ] | ae(v) |
| 39 |         if( intra_luma_mpm_flag[ x0 ][ y0 ] ) { | |
| 40 |           if( intra_luma_ref_idx[ x0 ] [ y0 ] = = 0 ) | |
| 41 |             intra_luma_not_planar_flag[ x0 ][ y0 ] | ae(v) |
| 42 |           if( intra_luma_not_planar_flag[ x0 ][ y0 ] ) | |
| 43 |             intra_luma_mpm_idx[ x0 ][ y0 ] | ae(v) |
| 44 |         } else | |
| 45 |           intra_luma_mpm_remainder[ x0 ][ y0 ] | ae(v) |
| 46 |       } | |
| 47 |     } | |
| 48 |   } | |
| 49 | } | |

Semantics of syntax elements related with ISP mode is described below. A syntax element, denoted intra_subpartitions_mode_flag[x0][y0], equal to 1 specifies that the current intra coding unit is partitioned into NumIntraSubPartitions[x0][y0] rectangular transform block subpartitions. The syntax element intra_subpartitions_mode_flag[x0][y0] equal to 0 specifies that the current intra coding unit is not partitioned into rectangular transform block subpartitions. When intra_subpartitions_mode_flag[x0][y0] is not present, it is inferred to be equal to 0.

A syntax element, denoted intra_subpartitions_split_flag[x0][y0], specifies whether the intra subpartitions split type is horizontal or vertical. When intra_subpartitions_split_flag[x0][y0] is not present, it is inferred as follows:

If cbHeight is greater than MaxTbSizeY, intra_subpartitions_split_flag[x0][y0] is inferred to be equal to 0.

Otherwise (cbWidth is greater than MaxTbSizeY), intra_subpartitions_split_flag[x0][y0] is inferred to be equal to 1.

The variable IntraSubPartitionsSplitType specifies the type of split used for the current luma coding block as illustrated in Table 4. IntraSubPartitionsSplitType is derived as follows:

If intra_subpartitions_mode_flag[x0][y0] is equal to 0, IntraSubPartitionsSplitType is set equal to 0.

Otherwise, the IntraSubPartitionsSplitType is set equal to 1+intra_subpartitions_split_flag[x0][y0].

TABLE 4

| IntraSubPartitionsSplitType | Name of IntraSubPartitionsSplitType |
|---|---|
| 0 | ISP_NO_SPLIT |
| 1 | ISP_HOR_SPLIT |
| 2 | ISP_VER_SPLIT |

The variable NumIntraSubPartitions specifies the number of transform block subpartitions into which an intra luma coding block is divided. NumIntraSubPartitions is derived as follows:

If IntraSubPartitionsSplitType is equal to ISP_NO_SPLIT, NumIntraSubPartitions is set equal to 1.

Otherwise, if one of the following conditions is true, NumIntraSubPartitions is set equal to 2:

cbWidth is equal to 4 and cbHeight is equal to 8,
cbWidth is equal to 8 and cbHeight is equal to 4.

Otherwise, NumIntraSubPartitions is set equal to 4.

Table 5 shows syntax of a transform tree in tabular form. The syntax related with ISP mode is shown at rows 26-34. Tables 6 and 7 together show syntax of a transform unit in tabular form. The syntax related with ISP mode is shown at rows 9-26.

TABLE 5

```
1    transform_tree( x0, y0, tbWidth, tbHeight, treeType, chType ) {
2        InferTuCbfLuma = 1
3        if( IntraSubPartitionsSplitType = = ISP_NO_SPLIT && !cu_sbt_flag ) {
4            if( tbWidth > MaxTbSizeY | | tbHeight > MaxTbSizeY ) {
5                verSplitFirst = ( tbWidth > MaxTbSizeY && tbWidth > tbHeight ) ? 1 : 0
6                trafoWidth = verSplitFirst ? (tbWidth / 2) : tbWidth
7                trafoHeight = !verSplitFirst ? (tbHeight / 2) : tbHeight
8                transform_tree( x0, y0, trafoWidth, trafoHeight, chType )
9                if( verSplitFirst )
10                   transform_tree( x0 + trafoWidth, y0, trafoWidth, trafoHeight, treeType, chType )
11               else
12                   transform_tree( x0, y0 + trafoHeight, trafoWidth, trafoHeight, treeType, chType )
13           } else {
14               transform_unit( x0, y0, tbWidth, tbHeight, treeType, 0, chType )
15           }
16       } else if( cu_sbt_flag ) {
17           if( !cu_sbt_horizontal_flag ) {
18               trafoWidth = tbWidth * SbtNumFourthsTb0 / 4
19               transform_unit( x0, y0, trafoWidth, tbHeight, treeType , 0, 0 )
20               transform_unit( x0 + trafoWidth, y0, tbWidth - trafoWidth, tbHeight, treeType, 1, 0 )
21           } else {
22               trafoHeight = tbHeight * SbtNumFourthsTb0 / 4
23               transform_unit( x0, y0, tbWidth, trafoHeight, treeType , 0, 0 )
24               transform_unit( x0, y0 + trafoHeight, tbWidth, tbHeight - trafoHeight, treeType, 1, 0 )
25           }
26*      } else if( IntraSubPartitionsSplitType = = ISP_HOR_SPLIT ) {
27*          trafoHeight = tbHeight / NumIntraSubPartitions
28*          for( partIdx = 0; partIdx < NumIntraSubPartitions; partIdx++ )
29*              transform_unit( x0, y0 + trafoHeight * partIdx, tbWidth, trafoHeight, treeType, partIdx, 0 )
30*      } else if( IntraSubPartitionsSplitType = = ISP_VER_SPLIT ) {
31*          trafoWidth = tbWidth / NumIntraSubPartitions
32*          for( partIdx = 0; partIdx < NumIntraSubPartitions; partIdx++ )
33*              transform_unit( x0 + trafoWidth * partIdx, y0, trafoWidth, tbHeight, treeType, partIdx, 0 )
34*      }
35   }
```

TABLE 6

```
1    transform_unit( x0, y0, tbWidth, tbHeight, treeType, subTuIndex, chType ) {
2            if( ( treeType = = SINGLE_TREE | | treeType = = DUAL_TREE_CHROMA ) &&
3                ChromaArrayType != 0 ) {
4                if( ( IntraSubPartitionsSplitType = = ISP_NO_SPLIT && !( cu_sbt_flag &&
                     ( ( subTuIndex = = 0 && cu_sbt_pos_flag ) | |
                     ( subTuIndex = = 1 && !cu_sbt_pos_flag ) ) ) ) | |
                     ( IntraSubPartitionsSplitType != ISP_NO_SPLIT &&
                     ( subTuIndex = = NumIntraSubPartitions - 1 ) ) ) {
5                    tu_cbf_cb[ x0 ][ y0 ]                                                    ae(v)
6                    tu_cbf_cr[ x0 ][ y0 ]                                                    ae(v)
7                }
8            }
9 *      if( treeType = = SINGLE_TREE | | treeType = = DUAL_TREE_LUMA ) {
10*          if( ( IntraSubPartitionsSplitType = = ISP_NO_SPLIT && !( cu_sbt_flag &&
                 ( ( subTuIndex = = 0 && cu_sbt_pos_flag ) | |
                 ( subTuIndex = = 1 && !cu_sbt_pos_flag ) ) ) &&
                 ( CuPredMode[ chType ][ x0 ][ y0 ] = = MODE_INTRA | |
                 tu_cbf_cb[ x0 ][ y0 ] | | tu_cbf_cr[ x0 ][ y0 ] | |
                 CbWidth[ chType ][ x0 ][ y0 ] > MaxTbSizeY | |
                 CbHeight[ chType ][ x0 ][ y0 ] > MaxTbSizeY ) ) | |
                 ( IntraSubPartitionsSplitType != ISP_NO_SPLIT &&
                 ( subTuIndex < NumIntraSubPartitions - 1 | | !InferTuCbfLuma ) ) )
11*              tu_cbf_luma[ x0 ][ y0 ]                                                      ae(v)
12*          if (IntraSubPartitionsSplitType != ISP_NO_SPLIT )
13*              InferTuCbfLuma = InferTuCbfLuma && !tu_cbf_luma[ x0 ][ y0 ]
14*      }
15*      if( IntraSubPartitionsSplitType != ISP_NO_SPLIT &&
16*          treeType = = SINGLE_TREE && subTuIndex = = NumIntraSubPartitions - 1 ) )
```

TABLE 6-continued

| | |
|---|---|
| 17* | xC = CbPosX[ chType ][ x0 ][ y0 ] |
| 18* | yC = CbPosY[ chType ][ x0 ][ y0 ] |
| 19* | wC = CbWidth[ chType ][ x0 ][ y0 ] / SubWidthC |
| 20* | hC = CbHeight[ chType ][ x0 ][ y0 ] / SubHeightC |
| 21* | } else |
| 22* | xC = x0 |
| 23* | yC = y0 |
| 24* | wC = tbWidth / SubWidthC |
| 25* | hC = tbHeight / SubHeightC |
| 26* | } |
| 27 | if( ( CbWidth[ chType ][ x0 ][ y0 ] > 64 \|\| CbHeight[ chType ][ x0 ][ y0 ] > 64 \|\| tu_cbf_luma[ x0 ][ y0 ] \|\| tu_cbf_cb[ x0 ][y0 ] \|\| tu_cbf_cr[ x0 ][ y0 ] ) && treeType != DUAL_TREE_CHROMA ) { |
| 28 | if( cu_qp_delta_enabled_flag && !IsCuQpDeltaCoded ) { |

TABLE 7

| | | |
|---|---|---|
| 29 | cu_qp_delta_abs | ae(v) |
| 30 | if( cu_qp_delta_abs ) | |
| 31 | cu_qp_delta_sign_flag | ae(v) |
| 32 | } | |
| 33 | } | |
| 34 | if( ( tu_cbf_cb[ x0 ][ y0 ] \|\| tu_cbf_cr[ x0 ][ y0 ] ) { | |
| 35 | if( cu_chroma_qp_offset_enabled_flag && !IsCuChromaQpOffsetCoded) { | |
| 36 | cu_chroma_qp_offset_flag | ae(v) |
| 37 | if( cu_chroma_qp_offset_flag && chroma_qp_offset_list_len_minus1 > 0 ) | |
| 38 | cu_chroma_qp_offset_idx | ae(v) |
| 39 | } | |
| 40 | } | |
| 41 | if( sps_joint_cbcr_enabled_flag && ( ( CuPredMode[ chType ][ x0 ][ y0 ] = = MODE_INTRA && ( tu_cbf_cb[ x0 ][ y0 ] \|\| tu_cbf_cr[ x0 ][ y0 ] ) ) \|\| ( tu_cbf_cb[ x0 ][ y0 ] && tu_cbf_cr[ x0 ][ y0 ] ) ) ) | |
| 42 | tu_joint_cbcr_residual_flag[ x0][y0] | ae(v) |
| 43 | if( tu_cbf_luma[ x0 ][ y0 ] && treeType != DUAL_TREE_CHROMA && ( tbWidth <= 32 ) && ( tbHeight <= 32 ) && ( IntraSubPartitionsSplit[ x0 ][ y0 ] = = ISP_NO_SPLIT) && ( !cu_sbt_flag ) ) { | |
| 44 | if( sps_transform_skip_enabled_flag && !BdpcmFlag[ x0 ][ y0 ] && tbWidth <= MaxTsSize && tbHeight <= MaxTsSize ) | |
| 45 | transform_skip_flag[ x0 ][ y0 ] | ae(v) |
| 46 | if( ( ( CuPredMode[ chType ][ x0 ][ y0 ] = = MODE_INTER && sps_explicit_mts_inter_enabled_flag ) \|\| ( CuPredMode[ chType ][ x0 ][ y0 ] = = MODE_INTRA && sps_explicit_mts_intra_enabled_flag ) ) && ( !transform_skip_flag[ x0 ][ y0 ] ) ) | ae(v) |
| 47 | tu_mts_idx[ x0 ][ y0 ] | |
| 48 | } | |
| 49 | if( tu_cbf_luma[ x0 ][ y0 ] ) { | |
| 50 | if( !transform_skip_flag[ x0 ][ y0 ] ) | |
| 51 | residual_coding( x0, y0, Log2( tbWidth ), Log2( tbHeight ), 0 ) | |
| 52 | else | |
| 53 | residual_ts_coding( x0, y0, Log2( tbWidth ), Log2( tbHeight ), 0 ) | |
| 54 | } | |
| 55 | if( tu_cbf_cb[ x0 ][ y0 ] ) | |
| 56 | residual_coding( xC, yC, Log2( wC ), Log2( hC ), 1 ) | |
| | if( tu_cbf_cr[ x0 ][ y0 ] && !( tu_cbf_cb[ x0 ][ y0 ] && tu_joint_cbcr_residual_flag[ x0 ][ y0 ] )) { | |
| 58 | residual_coding( xC, yC, Log2( wC ), Log2( hC ), 2 ) | |
| 59 | } | |
| 60 | } | |

An example of a transformation process for scaled transform coefficients is described below. Inputs to this process are:
- a luma location (xTbY, yTbY) specifying the top-left sample of the current luma transform block relative to the top left luma sample of the current picture,
- a variable nTbW specifying the width of the current transform block,
- a variable nTbH specifying the height of the current transform block,
- a variable cIdx specifying the colour component of the current block,
- an (nTbW)x(nTbH) array d[x][y] of scaled transform coefficients with x=0 . . . nTbW−1, y=0 . . . nTbH−1.

Output of this process is the (nTbW)x(nTbH) array r[x][y] of residual samples with x=0 . . . nTbW−1, y=0 . . . nTbH−1.

When lfnst_idx[xTbY][yTbY] is not equal to 0 and both nTbW and nTbH are greater than or equal to 4, the following applies:

The variables predModeIntra, nLfnstOutSize, log 2LfnstSize, nLfnstSize, and nonZeroSize are derived as follows:

$$predModeIntra=(cIdx==0)?IntraPredModeY[xTbY][yTbY]:IntraPredModeC[xTbY][yTbY]$$

$$nLfnstOutSize=(nTbW>=8\&\&nTbH>=8)?48:16$$

$$\log 2LfnstSize=(nTbW>=8\&\&nTbH>=8)?3:2$$

nLfnstSize=1<<log 2LfnstSize nonZeroSize=((nTbW==4&&nTbH==4)||
(nTbW==8&&nTbH==8))?8:16

When intra_mip_flag[xTbComp][yTbComp] is equal to 1 and cIdx is equal to 0, predModeIntra is set equal to INTRA_PLANAR.

When predModeIntra is equal to either INTRA_LT_C-CLM, INTRA_L_CCLM, or INTRA_T_CCLM, pred-ModeIntra is set equal to IntraPredModeY[xTbY+nTbW/2][yTbY+nTbH/2].

The wide angle intra prediction mode mapping process as specified in clause 8.4.5.2.6 is invoked with predModeIntra, nTbW, nTbH and cIdx as inputs, and the modified predModeIntra as output.

The values of the list u[x] with x=0 ... nonZeroSize-1 are derived as follows:

xC=DiagScanOrder[2][2][x][0]

yC=DiagScanOrder[2][2][x][1]

u[x]=d[xC][yC]

The one-dimensional low frequency non-separable transformation process as specified in clause 8.7.4.2 is invoked with the input length of the scaled transform coefficients nonZeroSize, the transform output length nTrS set equal to nLfnstOutSize, the list of scaled non-zero transform coefficients u[x] with x=0 ... nonZeroSize-1, the intra prediction mode for LFNST set selection predModeIntra, and the LFNST index for transform selection in the selected LFNST set lfnst_idx [xTbY][yTbY] as inputs, and the list v[x] with x= 0 ... nLfnstOutSize-1 as output.

The array d[x][y] with x=0 ... nLfnstSize-1, y=0 ... nLfnstSize-1 is derived as follows:
If predModeIntra is less than or equal to 34, the following applies:

d[x][y]=(y<4)?v[x+(y<<log 2LfnstSize)]:((x<4)?v[32+x+((y-4)<<2)]:d[x][y])

Otherwise, the following applies:

d[x][y]=(x<4)?v[y+(x<<log 2LfnstSize)]:((y<4)?v[32+y+((x-4)<<2)]:d[x][y])

The variable implicitMtsEnabled is derived as follows:
If sps_mts_enabled_flag is equal to 1 and one of the following conditions is true, implicitMtsEnabled is set equal to 1:
  IntraSubPartitionsSplitType is not equal to ISP_NO_SPLIT
  cu_sbt_flag is equal to 1 and Max(nTbW, nTbH) is less than or equal to 32
  sps_explicit_mts_intra_enabled_flag is equal to 0 and CuPredMode[0][xTbY][yTbY] is equal to MODE INTRA and lfnst_idx[x0][y0] is equal to 0 and intra_mip_flag[x0][y0] is equal to 0
Otherwise, implicitMtsEnabled is set equal to 0.
The variable trTypeHor specifying the horizontal transform kernel and the variable trTypeVer specifying the vertical transform kernel are derived as follows:
If cIdx is greater than 0, trTypeHor and trTypeVer are set equal to 0.
Otherwise, if implicitMtsEnabled is equal to 1, the following applies:
  If IntraSubPartitionsSplitType is not equal to ISP_NO_SPLIT or sps_explicit_mts_intra_enabled_flag is equal to 0 and CuPredMode[0][xTbY][yTbY] is equal to MODE INTRA, trTypeHor and trTypeVer are derived as follows:

trTypeHor=(nTbW>=4&&nTbW<=16)?1:0 trTypeVer=(nTbH>=4&&nTbH<=16)?1:0

Otherwise (cu_sbt_flag is equal to 1), trTypeHor and trTypeVer are specified in Table 8-15 depending on cu_sbt_horizontal_flag and cu_sbt_pos_flag.
Otherwise, trTypeHor and trTypeVer are specified depending on tu_mts_idx[xTbY][yTbY].

III. Improvement of ISP Coding Mode
1. Disallowing ISP Coding Mode

In some embodiments, ISP mode is disallowed for a current block under processing based on certain conditions in order to reduce processing cost. For example, both tree-structure base CTU partitioning and ISP coding mode can be used for partitioning coding blocks. For example, by employing the tree-based partitioning method, a block of a size of 32×16 samples may be split into four blocks each of a size of 8×16 samples. Such a partitioning result can also be achieved by applying the ISP coding mode.

When both of these two partition methods (tree-structure based and ISP mode based) are allowed, both methods may be evaluated during a coding process in order to acquire an optimized rate-distortion performance. These redundant operations may increase computational cost. In addition, syntax elements associated with both partitioning methods may be signaled, causing unnecessary overhead. Therefore, disallowing ISP mode under certain conditions can improve coding performance.

In an embodiment, an ISP mode can be disallowed for a current coding block when a block size of the current block satisfies a certain condition. For example, the block size can be represented by a block width, a block height, an aspect ratio of the current block, a minimum of the block width and the block height, a maximum of the block width and the block height, a sum of the block width and the block height, a block area, and the like. For example, when the block size of the current block is larger than or smaller than a threshold, the ISP mode can be disallowed.

In an embodiment, when a condition of disallowing an ISP mode for a current block is satisfied, an ISP mode flag, such as the intra_subpartitions_mode_flag at row 34 of Table 3, may not be signaled. An encoder can determine the ISP mode flag is not transmitted by investigating a block size of the current block. As an example, the validation processing at row 33 of Table 3 can be modified to include an validation of the block size of the current block.

In an embodiment, when the minimum of a block width and a block height of a current block is equal to or greater than a first threshold K1, an ISP mode can be disallowed for the current block. The threshold K1 can be a positive integer, such as 16 or 32 sample.

In another embodiment, when the maximum of a block width and a block height of a current block is equal to or greater than a second threshold K2, an ISP mode is disallowed for the current block. The second threshold K2 can be a positive integer, such as 32 or 64 sample.

In another embodiment, when the block area of a current block is equal to or greater than a third threshold K3, an ISP mode can be disallowed for the current block. The third threshold K3 can be a positive integer, such as 256 or 512 samples.

In another embodiment, when the block aspect ratio (e.g., a maximum of width/height and height/width) of a current block is equal to or smaller than a fourth threshold K4, an ISP mode can be disallowed for the current block. The fourth threshold K4 can be a positive integer and greater than 1, such as 2 or 4. The aspect ratio can be a maximum of a first ratio of a block width to a block height of the current block and a second ratio of the block height to the block width of the current block.

2. Context Model Selection for ISP Coding Mode

In some embodiments, for entropy coding (encoding or decoding) ISP mode information (e.g., an ISP mode flag) of a current block, a context model can be selected based on a block size of the current block. For example, the block size can be represented by a block width, a block height, an aspect ratio of the current block, a minimum of the block width and the block height, a maximum of the block width and the block height, a sum of the block width and the block height, a block area, and the like. For example, when the block size of the current block is larger than or equal to a threshold, a first context model can be selected. Otherwise, a second context model can be selected.

In an embodiment, an ISP mode flag is represented by one bin that is parsed from a bit stream by performing a parsing process. During the parsing process, one of two context models can be selected for parsing the bin based on a block size of the current block. When the block size is above a threshold, a first context index can be determined, while when the block size is below the threshold, a second context index can be determined. Subsequently, the context model associated with the first or second context index can be used for the parsing operation.

In a first example, a condition for context selection of an ISP mode flag of a current block may be defined as whether the minimum of a block width and a block height is equal to or greater than a first threshold M1. The first threshold M1 can be a positive integer, such as 16 or 32 sample.

In a second example, a condition for context selection of an ISP mode flag of a current block may be defined as whether the maximum of a block width and a block height is equal to or greater than a second threshold M2. The threshold M2 can be a positive integer, such as 16 or 32 sample.

In a third example, a condition for context selection of an ISP mode flag of a current block may be defined as whether a block area of the current block is equal to or greater than a third threshold M3. The third threshold M3 can be a positive integer, such as 256 or 512 samples.

In a fourth example, a condition for context selection of an ISP mode flag of a current block may be defined as whether the block aspect ratio (a maximum of width/height and height/width) of the current block is equal to or smaller than a fourth threshold M4. The fourth threshold M4 can be a positive integer, such as 1 or 2. The aspect ratio can be a maximum of a first ratio of a block width to a block height of the current block and a second ratio of the block height to the block width of the current block.

3. Applying ISP Coding Mode to Non-Square Blocks

In some embodiments, an ISP mode is applied to non-square blocks, and is not applied to square blocks. Accordingly, in an example, an ISP mode flag is signaled for non-square blocks, and no ISP mode flag is signaled for square blocks. As an example, the validation processing at row 33 of Table 3 can be revised to include an validation of whether the current block is a non-square block, for example, based on the block size of the current block.

In some embodiments, an ISP mode is only applied to non-square blocks, and a split type (e.g., intra_subpartitions_split_flag at two 36 of Table 3) is not signaled for a respective non-square block. An decoder can implicitly derive the split type based on a shape or a block size of a current block. For example, one or more partitions can be applied along a direction corresponding a longer side of the current block. For example, when a block width is larger than a block height of the current block, a horizontal ISP mode can be applied. The horizontal ISP mode means an ISP mode which generate sub-partitions with a smaller block height than the current block height but a same block width as the current block width. In contrast, when the block width is smaller than the block height, a vertical ISP mode can be applied. The vertical ISP mode means an ISP mode which generate sub-partitions with a smaller block width than the current block width but a same block height as the current block height.

In some embodiments, an ISP mode is only applied to non-square blocks, and one of a horizontal split type or a vertical split type is allowed for a current non-square block. Accordingly, an decoder can implicitly determine a partition type from the horizontal or vertical split type for partitioning a current non-square block when the ISP mode is used (selected) for the current non-square block.

In some embodiments, an ISP mode is only applied to non-square blocks, and only one of a horizontal split or a vertical split is allowed for a current non-square block.

In an embodiment, a horizontal ISP mode can be disallowed for a current block when a ratio of a block height to a block width of the block is greater than or equal to a first given threshold. Accordingly, a split type of the current block can be derived as a vertical split type when an ISP mode is used for the current block. Example values of the first given threshold include 2, 4, 8 or 16. In one example, a horizontal ISP is not allowed for blocks with a width of 8 sample and a height of 64 sample.

In an embodiment, a vertical ISP mode can be disabled (disallowed) for a current block when a ratio of a block width to a block height of the current block is greater than or equal to a second given threshold. Accordingly, a split type of the current block can be derived as a horizontal split type when an ISP mode is selected (used) for the current block. Example values of the second given threshold can include 2, 4, 8, or 16. In one example, a vertical ISP is not allowed for blocks with a width of 64 sample and a height of 8 sample.

IV. Example Processes

Figure 12:
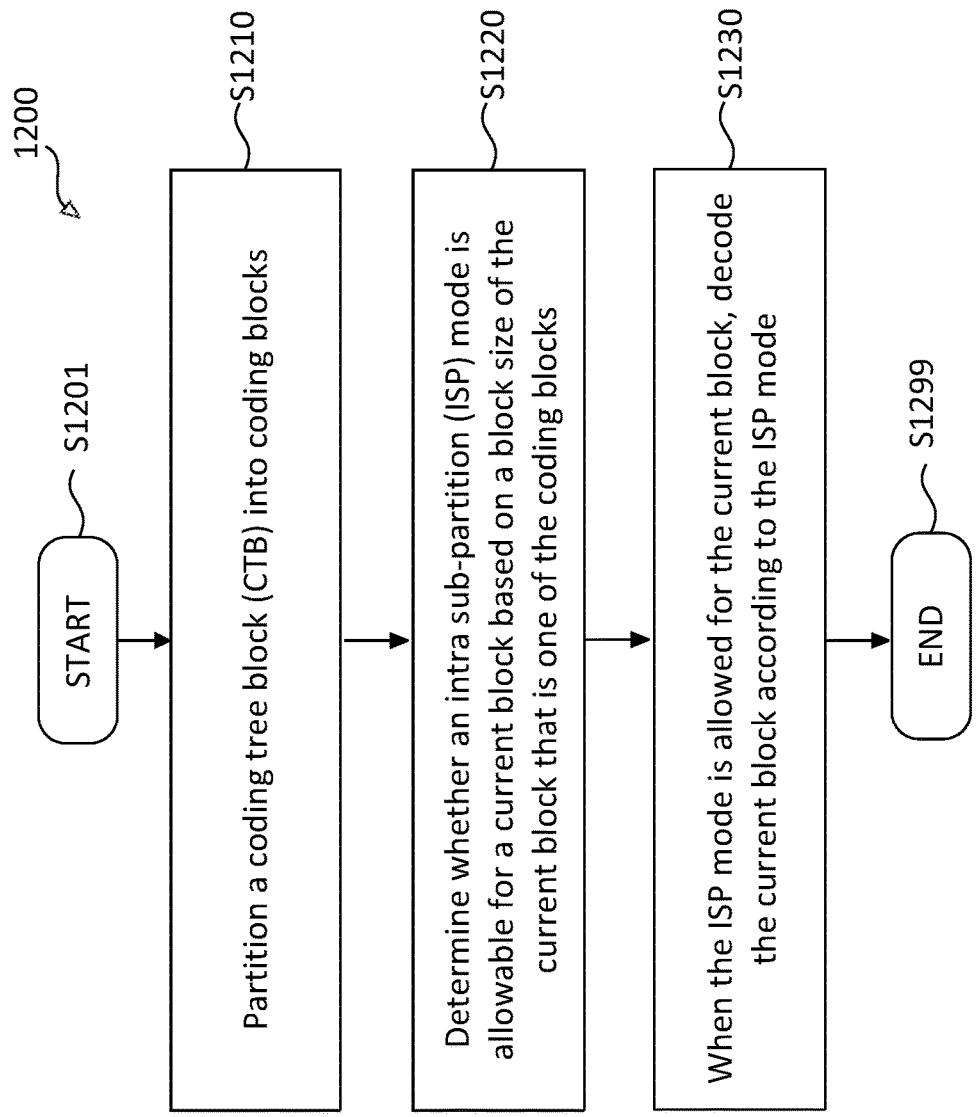
FIG. 12 shows a flow chart outlining a process (1200) according to an embodiment of the disclosure.

FIG. 12 shows a flow chart outlining a process (1200) according to an embodiment of the disclosure. The process (1200) can be used in the reconstruction of a block. In various embodiments, the process (1200) are executed by processing circuitry, such as the processing circuitry in the terminal devices (310), (320), (330) and (340), the processing circuitry that performs functions of the video decoder (410), the processing circuitry that performs functions of the video decoder (510), and the like. In some embodiments, the process (1200) is implemented in software instructions, thus when the processing circuitry executes the software instructions, the processing circuitry performs the process (1200). The process starts at (S1201) and proceeds to (S1210).

At (S1210), a coding tree block (CTB) corresponding to a CTU is partitioned into coding blocks at a decoder. For example, syntax elements indicating how the CTB is partitioned can be received in a bitstream corresponding to a video sequence. According to the syntax elements, the decoder can partition the CTB into multiple coding blocks. As a result of this partition process, positions and block sizes (e.g., width or height) of each coding block can be determined. The partition can be based on partitioning structures of a combination of quad-tree, binary tree, and ternary tree.

At (S1220), whether an ISP mode is allowable for the current can be determined based on a block size of the current block that is one of the coding blocks determined at (S1210). When the first block size satisfies a certain condition (e.g., according to the descriptions in Section III. 1), the ISP mode can be disallowed for the current block.

In an embodiment, when it is determined that the ISP mode is disallowed for the current block, the encoder can determine that no ISP mode flag indicating whether the ISP mode is used for the current block is signaled in the bitstream.

At (S1230), the current block can be decoded according to the ISP mode in response to determining the ISP mode is allowed for the current block. For example, when it is determined the ISP mode is allowed for the current block, the decoder can determine the ISP mode flag is signaled, and subsequently parse the ISP mode flag from the bit stream. In an example, the method of selection of a context model based on the block size as described in Section III. 2 may be used for parsing the ISP mode flag. In other examples, the method of Section III. 2 may not be used.

In an example, the decoder can subsequently determine whether the ISP mode is used or selected for the current block based on indication of the parsed ISP mode flag. If the ISP mode flag indicate the ISP mode is not used, the decoder can accordingly decode the current block based on a coding mode other than the ISP mode. If the ISP mode flag indicate the ISP mode is used for coding the current block, the decoder can proceed to decode the current block based on the ISP mode.

In an example, the decoder can determine whether an ISP mode split flag indicating a split type is signaled. In an example, when the ISP mode flag is signaled, it can be determined that the ISP mode split flag is signaled. The decoder may subsequently parse the ISP mode split flag from the bitstream. According to a partition direction indicated by the ISP mode split flag, the decoder can proceed with partitioning the current block into multiple sub-transform blocks (TB), and perform reconstructions of the sub-transform blocks sequentially (sub-transform block by sub-transform block).

In an example, the decoder may determine whether the ISP mode split flag is signaled based on the method described in Section III. 3. For example, when the current block is a non-square block, the decoder can determine no ISP mode split flag is signaled. The decoder can implicitly derive a split type based on a shape or block size of the current block using the method described in Section III. 3. After the slit type is derived, the decoder may proceed to reconstruct the current block by performing reconstructions of the sub-transform blocks partitioned from the current block.

The process (1200) can proceed to (S1299), and terminates at (S1299).

Figure 13:
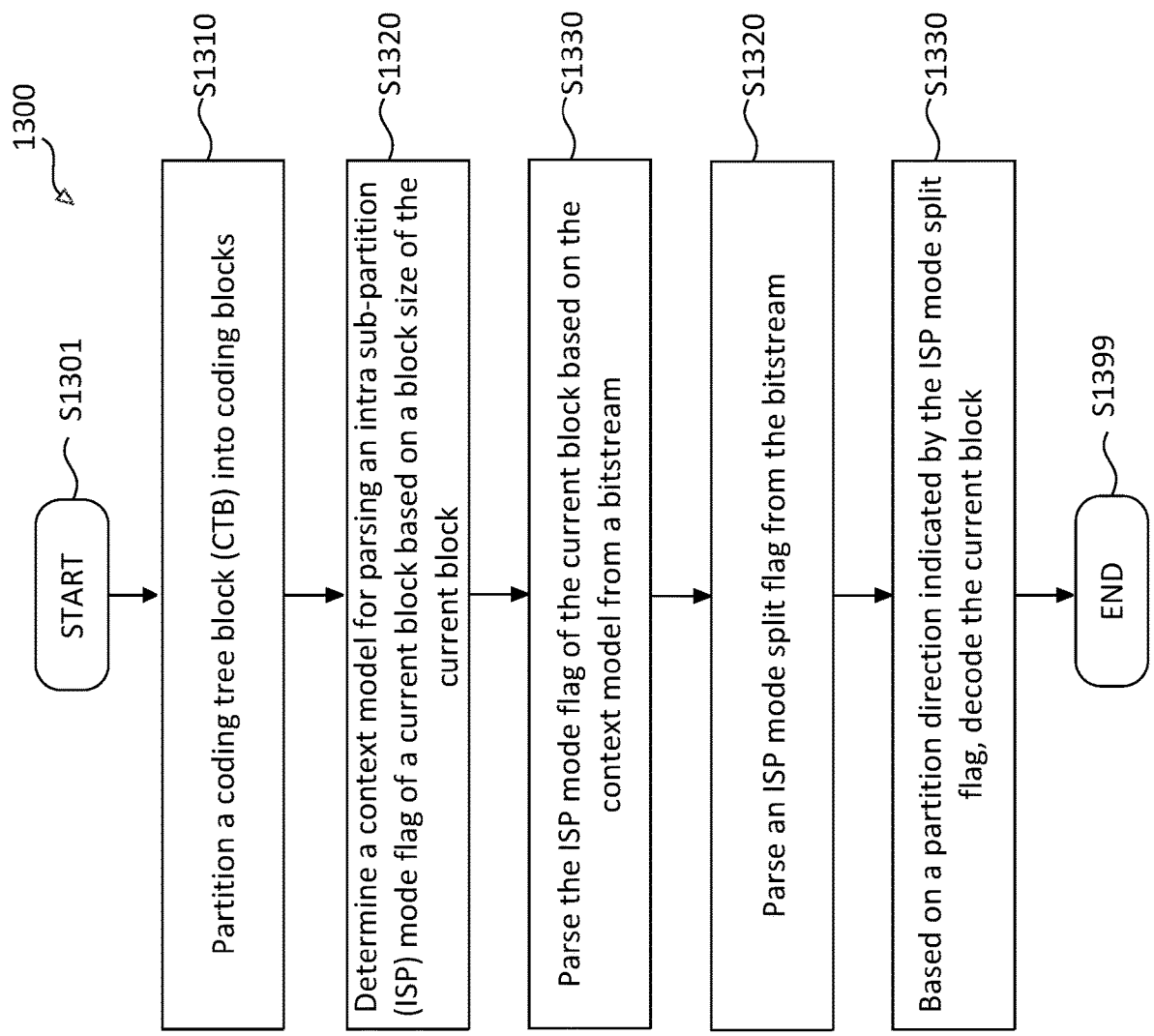
FIG. 13 shows a flow chart outlining a process (1300) according to an embodiment of the disclosure.

FIG. 13 shows a flow chart outlining a process (1300) according to an embodiment of the disclosure. The process (1300) can be used in the reconstruction of a block. In various embodiments, the process (1300) are executed by processing circuitry, such as the processing circuitry in the terminal devices (310), (320), (330) and (340), the processing circuitry that performs functions of the video decoder (410), the processing circuitry that performs functions of the video decoder (510), and the like. In some embodiments, the process (1300) is implemented in software instructions, thus when the processing circuitry executes the software instructions, the processing circuitry performs the process (1300). The process starts at (S1301) and proceeds to (S1310).

At (S1310), a CTB is partitioned into coding blocks at a decoder. For example, syntax elements indicating how the CTB is partitioned can be received in a bitstream corresponding to a video sequence. According to the syntax elements, the decoder can partition the CTB into multiple coding blocks. As a result of this partition process, positions and block sizes (e.g., width or height) of each coding block can be determined. The partition can be based on partitioning structures of a combination of quad-tree, binary tree, and ternary tree.

At (S1320), a context model for parsing an ISP mode flag of a current block can be determined based on a block size of the current block. The current block can be one of the coding blocks obtained at (S1310). For example, the method described in Section III. 2 can be used for determining the context model.

For example, when the current block is an intra coded luma block, and has a block width and height each smaller or equal to a maximum transform block size and a block area greater than a minimum transform block area, the decoder can determine the ISP mode flag is signaled. Accordingly, the decoder can proceed to determine the context model for parsing the ISP mode flag.

At (S1330), the ISP mode flag of the current block can be parsed from the bitstream based on the context model determined at (S1320). The ISP mode flag can indicate whether an ISP mode is used for coding the current block.

At (S1340), in response to that the ISP mode flag indicates the ISP mode is used for coding the current block, an ISP mode split flag can be parsed from the bitstream.

At (S1350), based on a partition direction (horizontal or vertical) indicated by the ISP mode split flag, the decoder may proceed to decode the current block according to the ISP mode. The process (1300) may proceed to (S1399), and terminates at (S1399).

Figure 14:
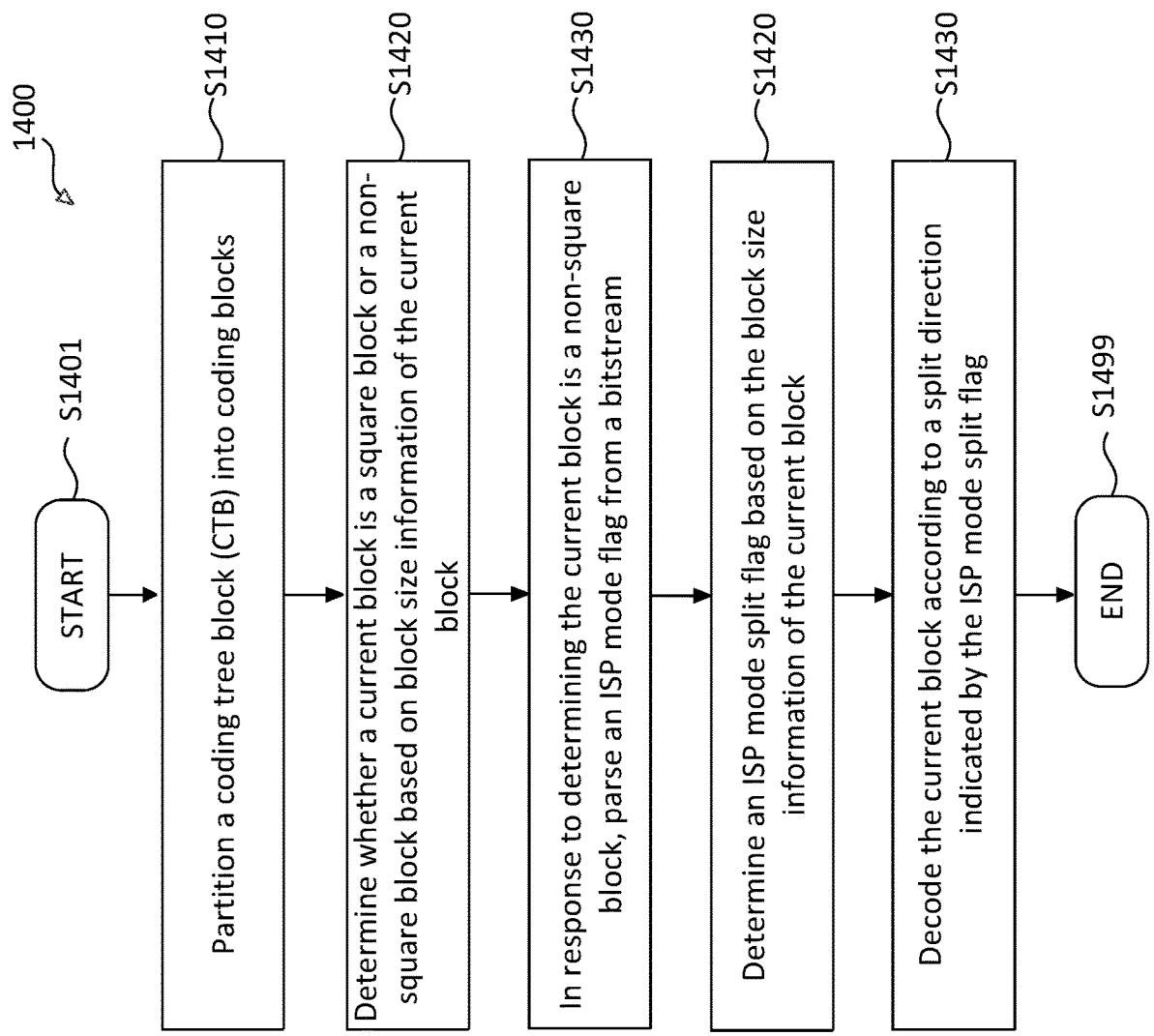
FIG. 14 shows a flow chart outlining a process (1400) according to an embodiment of the disclosure.

FIG. 14 shows a flow chart outlining a process (1400) according to an embodiment of the disclosure. The process (1400) can be used in the reconstruction of a block. In various embodiments, the process (1400) are executed by processing circuitry, such as the processing circuitry in the terminal devices (310), (320), (330) and (340), the processing circuitry that performs functions of the video decoder (410), the processing circuitry that performs functions of the video decoder (510), and the like. In some embodiments, the process (1400) is implemented in software instructions, thus when the processing circuitry executes the software instructions, the processing circuitry performs the process (1400). The process starts at (S1401) and proceeds to (S1410).

At (S1410), a CTB is partitioned into coding blocks at a decoder. For example, syntax elements indicating how the CTB is partitioned can be received in a bitstream corresponding to a video sequence. According to the syntax elements, the decoder can partition the CTB into multiple coding blocks. As a result of this partition process, positions and block size information (e.g., width or height) of each coding block can be determined. The partition can be based on partitioning structures of a combination of quad-tree, binary tree, and ternary tree.

At (S1420), whether a current block is a square block or a non-square block is determined based on block size information (e.g., a block width and height) of the current block obtained at (S1410). If the current block is a square block, the decoder can determine an ISP mode is not allowed for the current block. If the current block is a non-square block, the decoder can determine an ISP mode is allowed for the current block.

At (S1430), in response to determining the current block is a non-square block and the ISP mode is allowed for the current block, an ISP mode flag can be parsed from the bitstream in an example. The ISP mode flag can indicate whether the ISP mode is used for coding the current block.

At (S1440), an ISP mode split flag can be determined based on the block size information of the current block. For example, in response to the ISP mode flag indicates the ISP mode is used for coding the current block, the ISP mode split flag can be determined based on the block size information of the current block. For example, the method described in Section III. 3 can be used to implicitly determine the ISP mode split flag.

At (S1450), the current block can be decoded according to a split direction indicated by the ISP mode split flag. The process (1400) can proceed to (S1499) and terminate at (S1499).

V. Computer System

The techniques described above, can be implemented as computer software using computer-readable instructions and physically stored in one or more computer-readable media. For example, FIG. 15 shows a computer system (1500) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 15:
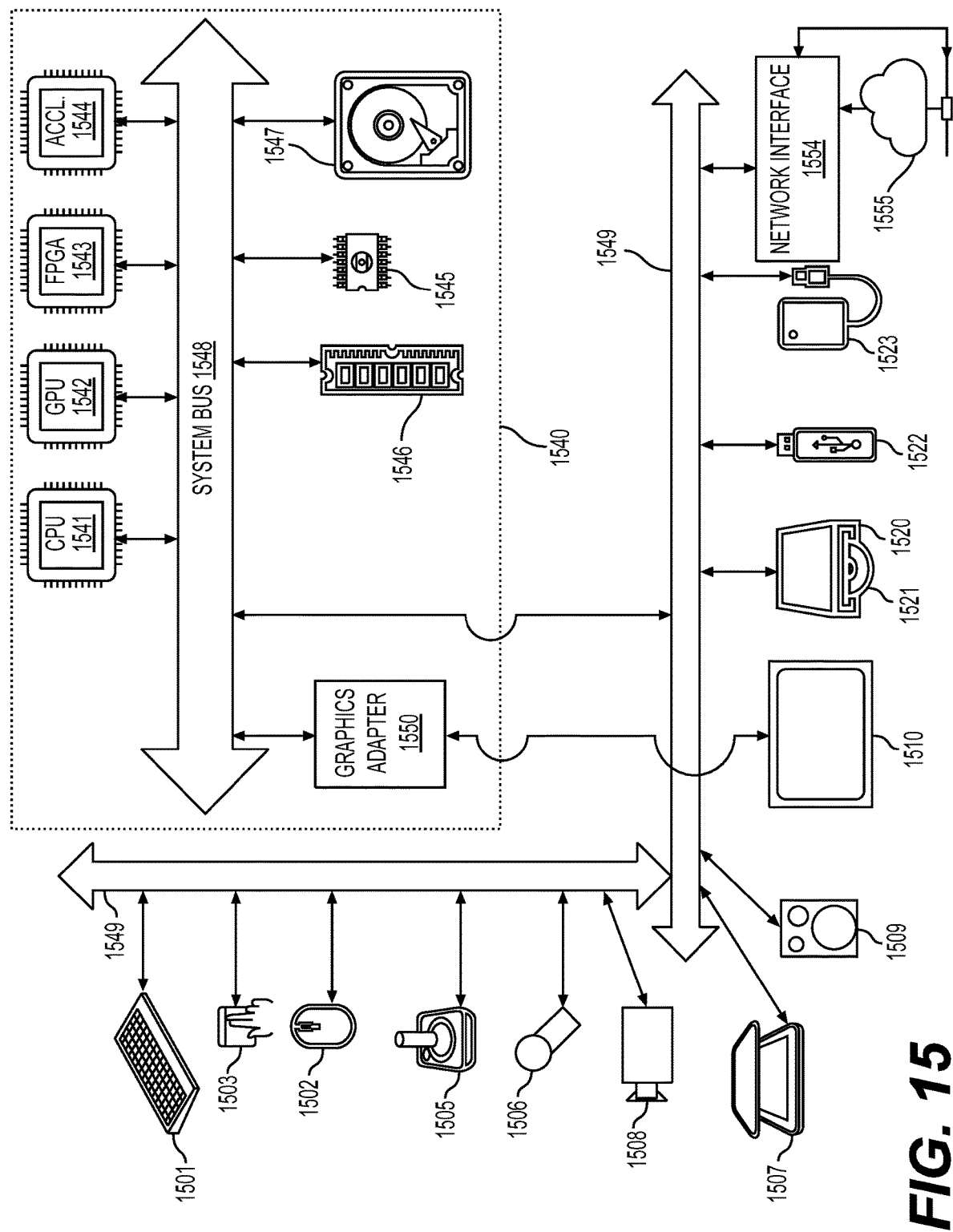
FIG. 15 is a schematic illustration of a computer system in accordance with an embodiment.

The components shown in FIG. 15 for computer system (1500) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1500).

Computer system (1500) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1501), mouse (1502), trackpad (1503), touch screen (1510), data-glove (not shown), joystick (1505), microphone (1506), scanner (1507), camera (1508).

Computer system (1500) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1510), data-glove (not shown), or joystick (1505), but there can also be tactile feedback devices that do not serve as input devices), audio output devices (such as: speakers (1509), headphones (not depicted)), visual output devices (such as screens (1510) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1500) can also include human accessible storage devices and their associated media such as optical media including CD/DVD ROM/RW (1520) with CD/DVD or the like media (1521), thumb-drive (1522), removable hard drive or solid state drive (1523), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1500) can also include an interface (1554) to one or more communication networks (1555). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1549) (such as, for example USB ports of the computer system (1500)); others are commonly integrated into the core of the computer system (1500) by attachment to a system bus as described below (for example Ethernet interface into a PC computer system or cellular network interface into a smartphone computer system). Using any of these networks, computer system (1500) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1540) of the computer system (1500).

The core (1540) can include one or more Central Processing Units (CPU) (1541), Graphics Processing Units (GPU) (1542), specialized programmable processing units in the form of Field Programmable Gate Areas (FPGA) (1543), hardware accelerators for certain tasks (1544), graphics adapters (~~50) and so forth. These devices, along with Read-only memory (ROM) (1545), Random-access memory (1546), internal mass storage such as internal non-user accessible hard drives, SSDs, and the like (1547), may be connected through a system bus (1548). In some computer systems, the system bus (1548) can be accessible in the form of one or more physical plugs to enable extensions by additional CPUs, GPU, and the like. The peripheral devices can be attached either directly to the core's system bus (1548), or through a peripheral bus (1549). In an example, the screen (1510) can be connected to the graphics adapter (1550). Architectures for a peripheral bus include PCI, USB, and the like.

CPUs (1541), GPUs (1542), FPGAs (1543), and accelerators (1544) can execute certain instructions that, in combination, can make up the aforementioned computer code. That computer code can be stored in ROM (1545) or RAM (1546). Transitional data can be also be stored in RAM (1546), whereas permanent data can be stored for example, in the internal mass storage (1547). Fast storage and retrieve to any of the memory devices can be enabled through the use of cache memory, that can be closely associated with one or more CPU (1541), GPU (1542), mass storage (1547), ROM (1545), RAM (1546), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1500), and specifically the core (1540) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1540) that are of non-transitory nature, such as core-internal mass storage (1547) or ROM (1545). The software implementing various embodiments of the present disclosure can be stored in such devices and executed by core (1540). A computer-readable medium can include one or more memory devices or chips, according to particular needs. The software can cause the core (1540) and specifically the processors therein (including CPU, GPU, FPGA, and the like) to execute particular processes or particular parts of particular processes described herein, including defining data structures stored in RAM (1546) and modifying such data structures according to the processes defined by the software. In addition or as an alternative, the computer system can provide functionality as a result of logic hardwired or otherwise embodied in a circuit (for example: accelerator (1544)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

ASIC: Application-Specific Integrated Circuit
BMS: Benchmark Set
BT: Binary Tree
CANBus: Controller Area Network Bus
CD: Compact Disc
CPUs: Central Processing Units
CRT: Cathode Ray Tube
CTBs: Coding Tree Blocks
CTU: Coding Tree Unit
CU: Coding Unit
DVD: Digital Video Disc
FPGA: Field Programmable Gate Areas
GOPs: Groups of Pictures
GPUs: Graphics Processing Units
GSM: Global System for Mobile communications
HDR: High Dynamic Range
HEVC: High Efficiency Video Coding
HRD: Hypothetical Reference Decoder
IC: Integrated Circuit
ISP: Intra Sub-Partitions
JEM: Joint Exploration Model
JVET: Joint Video Exploration Team
LAN: Local Area Network
LCD: Liquid-Crystal Display
LTE: Long-Term Evolution
MPM: Most Probable Mode
MV: Motion Vector
OLED: Organic Light-Emitting Diode
PBs: Prediction Blocks
PCI: Peripheral Component Interconnect
PDPC: Position Dependent Prediction Combination
PLD: Programmable Logic Device
PU: Prediction Unit
QT: Quad-Tree
RAM: Random Access Memory
ROM: Read-Only Memory
SDR: Standard Dynamic Range
SEI: Supplementary Enhancement Information
SNR: Signal Noise Ratio
SSD: Solid-State Drive
TT: Ternary Tree
TU: Transform Unit
USB: Universal Serial Bus
VUI: Video Usability Information
VVC: Versatile Video Coding
WAIP: Wide-Angle Intra Prediction While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method of video decoding by a video decoder, comprising:
    partitioning a coding tree block (CTB) into coding blocks;
    determining whether an intra sub-partition (ISP) mode is allowed for a current block of the coding blocks based on a block size of the current block;
    in response to the ISP mode being allowed for the current block, determining a context model for entropy decoding an ISP mode flag according to whether an aspect ratio of the current block is equal to or greater than a first threshold, the ISP mode flag indicating whether the ISP mode is applied to the current block, the aspect ratio being a larger one of (i) a first ratio of a block width to a block height of the current block and (ii) a second ratio of the block height to the block width of the current block; and decoding the current block according to the ISP mode.

2. The method of claim 1, wherein the block size is represented by one of:
a block width of the current block,
a block height of the current block, or
a sum of the block width and the block height of the current block.

3. The method of claim 1, wherein the determining whether the ISP mode is allowable includes:
determining the ISP mode is disallowed for the current block based on a smaller one of (i) the block width and (ii) the block height of the current block being equal to or greater than a second threshold.

4. The method of claim 1, wherein the determining whether the ISP mode is allowable includes:
determining the ISP mode is disallowed for the current block based on a larger one of (i) the block width and (ii) the block height of the current block being equal to or greater than a second threshold.

5. The method of claim 1, wherein the determining whether the ISP mode is allowable includes:
determining the ISP mode is disallowed for the current block based on a block area of the current block being equal to or greater than a second threshold.

6. The method of claim 1, wherein the determining whether the ISP mode is allowable includes:
determining the ISP mode is disallowed for the current block based on the aspect ratio of the current block being equal to or smaller than a second threshold.

7. The method of claim 6, wherein the second threshold is an integer greater than 1.

8. The method of claim 1, wherein the ISP mode is applicable to non-square blocks, and not applicable to square blocks.

9. The method of claim 8, wherein either of a horizontal split type or a vertical split type is allowed for each of the non-square blocks.

10. The method of claim 8, wherein the decoding the current block includes:
determining a split type indicating a vertical split or a horizontal split based on the block width and the block height of the current block.

11. The method of claim 8, wherein the decoding the current block includes:
in response to the ISP mode being allowed for the current block, determining a vertical split type for the current block based on a ratio of the block height of the current block to the block width of the current block being greater than or equal to a third threshold, and determining a horizontal split type for the current block based on a ratio of the block width of the current block to the block height of the current block being greater than or equal to a fourth threshold.

12. The method of claim 8, wherein a horizontal split of the ISP mode is not allowed for a coding block of the non-square blocks having a width of 8 samples and a height of 64 samples, and a vertical split of the ISP mode is not allowed for a coding block of the non-square blocks having a width of 64 samples and a height of 8 samples.

13. An apparatus of video decoding, comprising circuitry configured to:
partition a coding tree block (CTB) into coding blocks;
determine whether an intra sub-partition (ISP) mode is allowed for a current block of the coding blocks based on a block size of the current block;
in response to the ISP mode being allowed for the current block, determine a context model for entropy decoding an ISP mode flag according to whether an aspect ratio of the current block is equal to or greater than a first threshold, the ISP mode flag indicating whether the ISP mode is applied to the current block, the aspect ratio being a larger one of (i) a first ratio of a block width to a block height of the current block and (ii) a second ratio of the block height to the block width of the current block; and
decode the current block according to the ISP mode.

14. A non-transitory computer-readable medium storing instructions that, when executed by a processor, cause the processor to perform a method of video decoding, the method comprising:
partitioning a coding tree block (CTB) into coding blocks;
determining whether an intra sub-partition (ISP) mode is allowed for a current block of the coding blocks based on a block size of the current block;
in response to the ISP mode being allowed for the current block, determining a context model for entropy decoding an ISP mode flag according to whether an aspect ratio of the current block is equal to or greater than a first threshold, the ISP mode flag indicating whether the ISP mode is applied to the current block, the aspect ratio being a larger one of (i) a first ratio of a block width to a block height of the current block and (ii) a second ratio of the block height to the block width of the current block; and
decoding the current block according to the ISP mode.

* * * * *